US011974001B2

(12) United States Patent
Asbun et al.

(10) Patent No.: US 11,974,001 B2
(45) Date of Patent: *Apr. 30, 2024

(54) SECONDARY CONTENT INSERTION IN 360-DEGREE VIDEO

(71) Applicant: VID SCALE, INC., Wilmington, DE (US)

(72) Inventors: Eduardo Asbun, Santa Clara, CA (US); Yong He, San Diego, CA (US); Srinivas Gudumasu, Montreal (CA); Ahmed Hamza, Coquitlam (CA); Yan Ye, San Diego, CA (US)

(73) Assignee: VID Scale, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/106,128

(22) Filed: Feb. 6, 2023

(65) Prior Publication Data

US 2023/0199241 A1 Jun. 22, 2023

Related U.S. Application Data

(63) Continuation of application No. 16/324,601, filed as application No. PCT/US2017/046975 on Aug. 15, 2017, now Pat. No. 11,575,953.

(Continued)

(51) Int. Cl.
*H04N 21/2668* (2011.01)
*G06T 19/00* (2011.01)
(Continued)

(52) U.S. Cl.
CPC ....... *H04N 21/2668* (2013.01); *G06T 19/006* (2013.01); *H04N 21/25891* (2013.01);
(Continued)

(58) Field of Classification Search
None
See application file for complete search history.

(56) References Cited

U.S. PATENT DOCUMENTS 5,872,588 A 2/1999 Aras et al.
6,282,713 B1 8/2001 Kitsukawa et al.
(Continued)

FOREIGN PATENT DOCUMENTS

EP 3761645 A1 1/2021
KR 10-2009-0132317 A 12/2009
WO 2012/168365 A1 12/2012

OTHER PUBLICATIONS

ANSI/SCTE, "Digital Program Insertion Cueing Message for Cable", Society of Cable Telecommunications Engineers, Engineering Committee, ANSI/SCTE 35 2016, 2016, 73 pages.

(Continued)

*Primary Examiner* — An Son P Huynh
(74) *Attorney, Agent, or Firm* — Jeffery Brosemer

(57) ABSTRACT

A secondary content such as an advertisement may be inserted based on users' interests in 360 degree video streaming. Users may have different interests and may watch different areas within a 360 degree video. The information about area(s) of 360 degree scenes that users watch the most may be used to select an ad(s) relevant to their interests. One or more secondary content viewports may be defined within a 360 degree video frame. Secondary content viewport parameter(s) may be tracked. For example, statistics of the user's head orientation for some time leading to the presentation of the ad(s) may be collected. Secondary content may be determined based on the tracked secondary content viewport parameter(s).

10 Claims, 24 Drawing Sheets

Related U.S. Application Data

(60) Provisional application No. 62/376,227, filed on Aug. 17, 2016.

(51) Int. Cl.
  *H04N 21/258* (2011.01)
  *H04N 21/414* (2011.01)
  *H04N 21/431* (2011.01)
  *H04N 21/435* (2011.01)
  *H04N 21/442* (2011.01)
  *H04N 21/482* (2011.01)
  *H04N 21/6587* (2011.01)
  *H04N 21/81* (2011.01)
  *H04N 21/845* (2011.01)

(52) U.S. Cl.
  CPC ... *H04N 21/41407* (2013.01); *H04N 21/4316* (2013.01); *H04N 21/435* (2013.01); *H04N 21/44218* (2013.01); *H04N 21/4825* (2013.01); *H04N 21/6587* (2013.01); *H04N 21/812* (2013.01); *H04N 21/816* (2013.01); *H04N 21/8456* (2013.01)

(56) References Cited

U.S. PATENT DOCUMENTS

| | | |
|---|---|---|
| 6,298,482 B1 | 10/2001 | Seidman et al. |
| 6,530,082 B1 | 3/2003 | Del Sesto et al. |
| 7,117,517 B1 | 10/2006 | Milazzo et al. |
| 7,343,617 B1 | 3/2008 | Katcher et al. |
| 7,779,438 B2 | 8/2010 | Davies |
| 8,079,054 B1 | 12/2011 | Dhawan et al. |
| 8,970,666 B2 | 3/2015 | DiGiovanni et al. |
| 9,122,321 B2 | 9/2015 | Perez et al. |
| 9,137,558 B2 | 9/2015 | Gibbon et al. |
| 9,363,569 B1 | 6/2016 | Van Hoff et al. |
| 9,384,587 B2 | 7/2016 | Davison et al. |
| 9,507,417 B2 | 11/2016 | Dal Mutto et al. |
| 9,538,219 B2 | 1/2017 | Sakata et al. |
| 9,582,516 B2 | 2/2017 | Mckinnon et al. |
| 9,736,503 B1 | 8/2017 | Bakshi et al. |
| 9,842,268 B1 | 12/2017 | Krafka et al. |
| 9,992,553 B2 | 6/2018 | Bennett et al. |
| 10,097,867 B2 | 10/2018 | Bettendorf et al. |
| 2002/0056087 A1 | 5/2002 | Berezowski et al. |
| 2002/0056136 A1 | 5/2002 | Wistendahl et al. |
| 2002/0067678 A1 | 6/2002 | Jeon et al. |
| 2002/0120931 A1 | 8/2002 | Huber et al. |
| 2002/0120934 A1 | 8/2002 | Abrahams |
| 2002/0126990 A1 | 9/2002 | Rasmussen et al. |
| 2002/0131511 A1 | 9/2002 | Zenoni |
| 2002/0133817 A1 | 9/2002 | Markel |
| 2002/0147987 A1 | 10/2002 | Reynolds et al. |
| 2002/0174425 A1 | 11/2002 | Markel et al. |
| 2003/0028873 A1 | 2/2003 | Lemmons |
| 2003/0149983 A1 | 8/2003 | Markel |
| 2004/0031062 A1 | 2/2004 | Lemmons |
| 2004/0210942 A1 | 10/2004 | Lemmons |
| 2004/0261100 A1 | 12/2004 | Huber et al. |
| 2005/0149964 A1 | 7/2005 | Thomas et al. |
| 2007/0019889 A1 | 1/2007 | Peter et al. |
| 2007/0104369 A1 | 5/2007 | Weatherhead |
| 2007/0136753 A1 | 6/2007 | Bovenschulte et al. |
| 2007/0226761 A1 | 9/2007 | Zalewski et al. |
| 2008/0127253 A1 | 5/2008 | Zhang et al. |
| 2009/0131764 A1 | 5/2009 | Lee et al. |
| 2009/0133051 A1 | 5/2009 | Hildreth |
| 2009/0138805 A1 | 5/2009 | Hildreth |
| 2009/0276805 A1 | 11/2009 | Andrews, II et al. |
| 2009/0307721 A1 | 12/2009 | Afram et al. |
| 2010/0161409 A1 | 6/2010 | Ryu et al. |
| 2010/0299630 A1 | 11/2010 | Mccutchen et al. |
| 2010/0321389 A1 | 12/2010 | Gay et al. |
| 2011/0050656 A1 | 3/2011 | Sakata et al. |
| 2011/0069940 A1 | 3/2011 | Shimy et al. |
| 2011/0145856 A1 | 6/2011 | Agarwal et al. |
| 2011/0245943 A1 | 10/2011 | Agarwal et al. |
| 2011/0282906 A1 | 11/2011 | Wong |
| 2011/0298702 A1 | 12/2011 | Sakata et al. |
| 2012/0030637 A1 | 2/2012 | Dey et al. |
| 2012/0154557 A1 | 6/2012 | Perez et al. |
| 2012/0167146 A1 | 6/2012 | Incorvia |
| 2012/0229909 A1 | 9/2012 | Clavin et al. |
| 2012/0278179 A1 | 11/2012 | Campbell et al. |
| 2013/0016910 A1 | 1/2013 | Murata et al. |
| 2013/0031582 A1 | 1/2013 | Tinsman et al. |
| 2013/0036442 A1 | 2/2013 | Wingert |
| 2013/0050268 A1 | 2/2013 | Lohrenz et al. |
| 2013/0061262 A1 | 3/2013 | Briggs et al. |
| 2013/0076853 A1 | 3/2013 | Diao |
| 2013/0091515 A1 | 4/2013 | Sakata et al. |
| 2013/0173765 A1 | 7/2013 | Korbecki |
| 2013/0241925 A1 | 9/2013 | Kawana et al. |
| 2013/0293456 A1 | 11/2013 | Son et al. |
| 2013/0342539 A1 | 12/2013 | Khan et al. |
| 2014/0168056 A1 | 6/2014 | Swaminathan et al. |
| 2014/0195918 A1 | 7/2014 | Friedlander |
| 2014/0210714 A1 | 7/2014 | Kang et al. |
| 2015/0106856 A1 | 4/2015 | Rankine |
| 2015/0172775 A1 | 6/2015 | Yee et al. |
| 2015/0244747 A1 | 8/2015 | Wickenkamp et al. |
| 2015/0296250 A1 | 10/2015 | Casper |
| 2015/0325268 A1 | 11/2015 | Berger et al. |
| 2015/0373385 A1 | 12/2015 | Straub et al. |
| 2016/0021412 A1 | 1/2016 | Zito, Jr. |
| 2016/0072820 A1 | 3/2016 | Shaffer |
| 2016/0173883 A1 | 6/2016 | Lawrence et al. |
| 2016/0217623 A1 | 7/2016 | Singh et al. |
| 2016/0253795 A1 | 9/2016 | Cole et al. |
| 2016/0301862 A1 | 10/2016 | Rantakokko et al. |
| 2016/0311323 A1 | 10/2016 | Lee et al. |
| 2016/0366203 A1 | 12/2016 | Blong et al. |
| 2016/0381427 A1 | 12/2016 | Taylor et al. |
| 2017/0006322 A1 | 1/2017 | Dury et al. |
| 2017/0013031 A1 | 1/2017 | Kweon et al. |
| 2017/0212583 A1 | 7/2017 | Krasadakis |
| 2017/0223083 A1 | 8/2017 | Maze et al. |
| 2017/0264920 A1 | 9/2017 | Mickelsen |
| 2017/0366867 A1 | 12/2017 | Davies et al. |
| 2018/0157926 A1 | 6/2018 | Krafka et al. |
| 2018/0310066 A1 | 10/2018 | Kobayashi et al. |
| 2019/0075359 A1 | 3/2019 | Boss et al. |
| 2019/0339831 A1 | 11/2019 | Kobayashi et al. |

OTHER PUBLICATIONS

Bernhard et al., "Manipulating Attention in Computer Games", IVMSP Workshop, IEEE, Jun. 2011, 6 pages.

DASH Industry Forum, "Guidelines for Implementation: DASH-IF Interoperability Points", Version 3.2, Dec. 24, 2015, 147 pages.

ISO/IEC, "Information Technology-Dynamic Adaptive Streaming over HTTP (DASH)—Part 1: Media Presentation Description and Segment Formats", ISO/IEC 23009-1:2014, 2nd Edition, May 15, 2014, 152 pages.

Marston et al., "First Version of Playout Clients", ICoSOLE, Deliverable D5.2, Jun. 29, 2015, 41 pages.

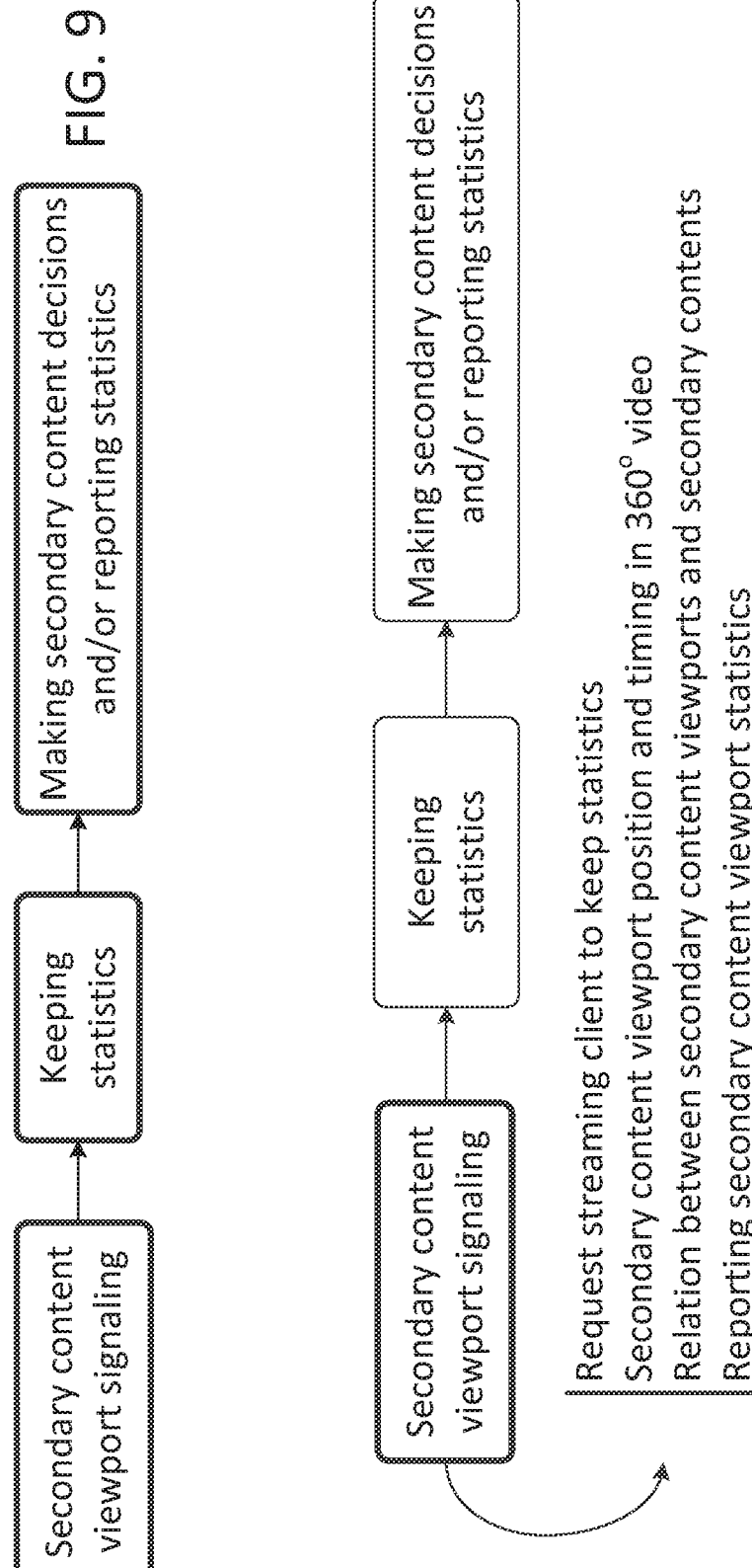

SECONDARY CONTENT INSERTION IN 360-DEGREE VIDEO

CROSS REFERENCE TO RELATED APPLICATIONS

This application is a continuation application of U.S. Non-Provisional application Ser. No. 16/324,601, filed Feb. 11, 2019, which is the National Stage Entry under 35 U.S.C. § 371 of Patent Cooperation Treaty Application No. PCT/US2017/046975, filed Aug. 15, 2017, which claims the benefit of U.S. Provisional Patent Application No. 62/376,227, filed on Aug. 17, 2016, the disclosure of which is hereby incorporated by reference in its entirety.

BACKGROUND

Virtual 360° video is a rapidly growing format emerging in the media industry. 360° video is enabled by the growing availability of virtual reality (VR) devices. 360° video may provide the viewer a new sense of presence. When compared to rectilinear video (e.g., 2D or 3D), 360° video may pose difficult challenges on video processing and/or delivery. Enabling comfort and/or an immersive user experience may require high video quality and/or very low latency. The large video size of 360° video may be an impediment to delivering the 360° video to a large number of users.

HTTP streaming has become a dominant approach in commercial deployments. For instance, streaming platforms such as Apple's HTTP Live Streaming (HLS), Microsoft's Smooth Streaming (SS), and/or Adobe's HTTP Dynamic Streaming (HDS) may use HTTP streaming as an underlying delivery method. A standard for HTTP streaming of multimedia content may enable a standard-based client to stream content from any standard-based server (e.g., thereby enabling interoperability between servers and clients of different vendors). MPEG Dynamic Adaptive Streaming over HTTP (MPEG-DASH) may be a universal delivery format that provides end users with the best possible video experience by dynamically adapting to changing network conditions. DASH may be built on top of the HTTP/TCP/IP stack. DASH may define a manifest format, Media Presentation Description (MPD), and segment formats for ISO Base Media File Format and MPEG-2 Transport Streams.

SUMMARY

Methods, systems, and instrumentalities are disclosed for inserting secondary content into a 360 degree video. Secondary content, such as an advertisement may be inserted based on users' interests in 360 degree video streaming. Users may have different interests and may watch different areas within a 360 degree video. The information about area(s) of 360 degree scenes that users watch the most may be used to select a secondary content relevant to their interests. One or more secondary content viewports may be defined within a 360 degree video frame. Statistics of the user's head orientation for some time leading to the presentation of the secondary content may be collected. The secondary content may be determined based on statistics of the user's head orientation.

Statistics of user's head orientation may be collected over the entire streaming session, over a particular period, or over specific time intervals. Various media presentation description (MPD) elements such as descriptor or event at MPD level, Period level or the Adaptation Set level may be used to activate the tracking of user's head orientation statistics information. Orientation statistics may be used for determining secondary contents. For example, a video streaming client may use orientation statistics for app-based secondary content insertion. The video streaming client may send back orientation statistics to a secondary content decision server for server-based secondary content insertion. The secondary content decision server may update the MPD by inserting the corresponding secondary content based on orientation statistics. For example, the secondary content decision server may select different advertisements in response to orientation statistics which indicate viewer interest in different secondary content viewports.

Secondary contents may be inserted in a 360 degree video. For example, the 360 degree video may include one or more secondary content viewports, and their respective secondary content viewport locations may be received. For example, a MPD file may be received that may define one or more secondary content viewports by specifying their corresponding horizontal and/or vertical position of a reference point of the secondary content viewport, a width and/or height of the secondary content viewport, and/or a secondary content viewport identifier. A request for tracking one or more secondary content viewport viewing parameters for the secondary content viewport(s) may be received. For example, the MPD file may indicate that the view counts, view duration and/or viewing orientation statistics associated with the secondary content viewports may be tracked. The request may indicate that the secondary content viewport viewing parameter may be tracked periodically (e.g., by specifying a secondary content viewport classification frequency), over a period, and/or over a particular time period.

In response to the request, the secondary content viewport viewing parameter for the secondary content viewport may be tracked based on the secondary content viewport location associated with the secondary content viewport and a viewer's viewing orientation. For example, whether the viewer's viewing orientation falls within the secondary content viewport may be determined, and the secondary content viewport viewing parameter may be updated accordingly. A secondary content may be selected, and a secondary content insertion location may be determined based on the tracked secondary content viewport viewing parameter. For example, the most viewed secondary content viewport may be determined based on the tracked secondary content viewport viewing parameter. The secondary content may be selected based on the content associated with the most viewed secondary content viewport. A secondary content insertion position, a size and/or a secondary content insert type may be determined based on the secondary content viewport viewing parameter(s).

BRIEF DESCRIPTION OF THE DRAWINGS

A more detailed understanding of the embodiments disclosed herein may be had from the following description, given by way of example in conjunction with the accompanying drawings.

FIG. 9 shows example components for supporting secondary content insertion using secondary content viewport information.

FIG. 10 shows example DASH signaling for secondary content insertion using secondary content viewports.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

In dynamic HTTP streaming, various bitrate alternatives of the multimedia content may be available at the server. The multimedia content may include several media components (e.g., audio, video, text), each of which may have different characteristics. In MPEG-DASH, the characteristics may be described by a Media Presentation Description (MPD).

Figure 1:
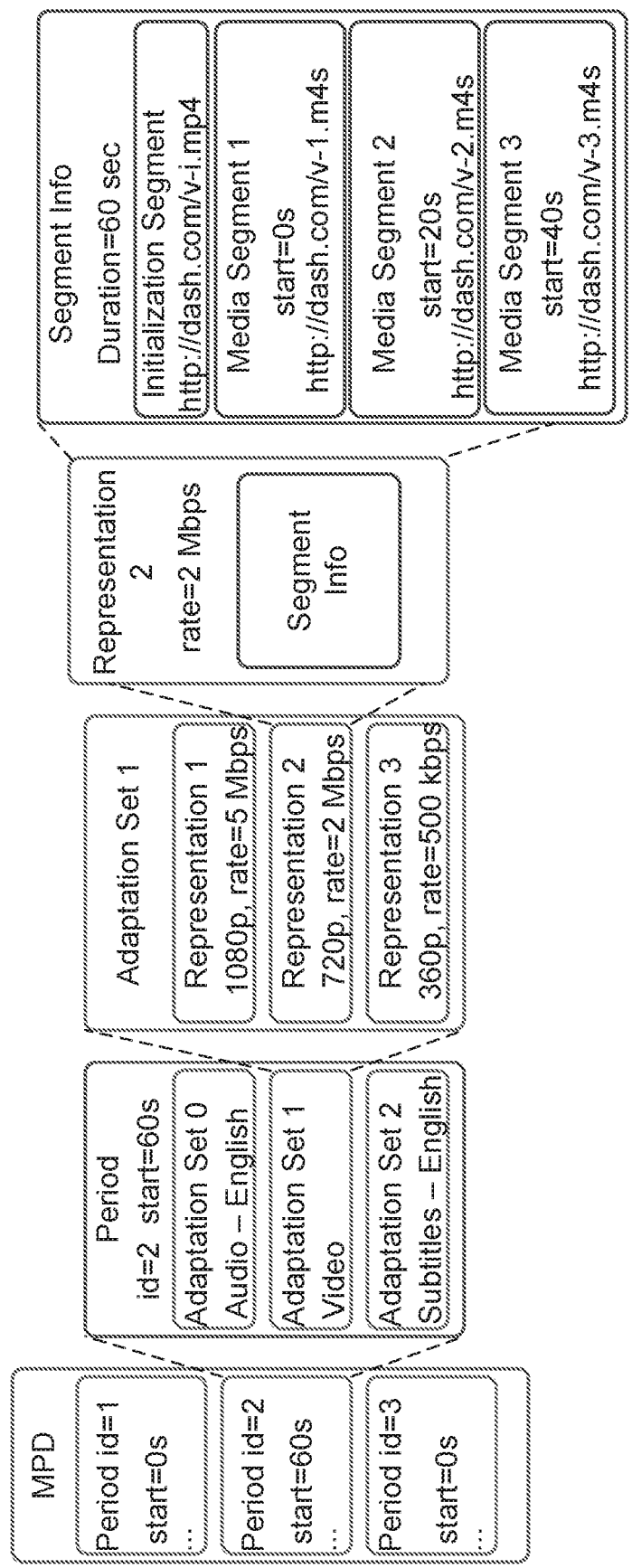
FIG. 1 depicts an example media presentation description (MPD) hierarchical data model.

The MPD may be an XML document that includes metadata for a DASH client to construct appropriate HTTP-URLs to access video segments (e.g., as described herein) in an adaptive manner during streaming sessions. FIG. 1 depicts an example MPD hierarchical data model. The MPD may describe a sequence of Periods, where a consistent set of encoded versions of the media content components may remain the same during a Period. A Period may be associated with a starting time and duration. A Period may include one or more adaptation sets (e.g., AdaptationSet).

An AdaptationSet may represent a set of encoded versions of one or more media content components sharing one or more identical properties, such as the language, the media type, the picture aspect ratio, the role, the accessibility, the viewpoint, and/or the rating property. For instance, a first AdaptationSet may include different bitrates of the video component of the same multimedia content. A second AdaptationSet may include different bitrates of the audio component (e.g., lower quality stereo and/or higher quality surround sound) of the same multimedia content. An AdaptationSet may include multiple Representations.

A Representation may describe a deliverable encoded version of one or several media components, varying from other representations by bitrate, resolution, number of channels, and/or other characteristics. A representation may include one or more segments. One or more attributes of a Representation element (e.g., such as @id, @bandwidth, @qualityRanking, and @dependencyId) may be used to specify one or more properties of the associated Representation.

A Segment may be the largest unit of data that can be retrieved with a single HTTP request. A segment may be associated with a URL (e.g., an addressable location on a server). The segment may be downloaded using HTTP GET or HTTP GET with byte ranges.

A DASH client may parse a MPD XML document. The DASH client may select a collection of AdaptationSets suitable for its environment, for example, based on information provided in the AdaptationSet elements. Within an AdaptationSet, the client may select a Representation. The client may select the Representation based on the value of @bandwidth attribute, client decoding capabilities, and/or client rendering capabilities. The client may download an initialization segment of the selected Representation. The client may access content, for example, by requesting entire Segments or byte ranges of Segments. When the presentation has started, the client may continue consuming the media content. For example, the client may request Media Segments and/or parts of Media Segments during the presentation. The client may play content according to a media presentation timeline. The client may switch from a first Representation to a second Representation, based on updated information from the client's environment. The client may play the content continuously across two or more Periods. When the client is consuming media contained in the Segments towards the end of the announced media in the Representation, the Media Presentation may be terminated, a Period may be started, and/or the MPD may be re-fetched.

The MPD descriptor element, Descriptor, may be provided to the application to instantiate one or more description elements with the appropriate scheme information. One or more Descriptors such as content protection, role, accessibility, rating, viewpoint, frame packing, and/or UTC timing descriptor may include a @schemeIdUri attribute to identify the relative scheme.

A supplemental property descriptor (SupplementalProperty) may include metadata that may be used by the DASH client for optimizing processing. An essential property descriptor (EssentialProperty) may include metadata for processing the containing element.

A Role MPD element may be associated with a @schemeIdUri attribute for identifying the role scheme employed to identify the role of the media content component. One or more Roles may define and/or describe one or more characteristics and/or structural functions of media content components. An Adaptation Set and/or a media content component may have multiple assigned roles (e.g., in different schemes or within the same scheme).

Figure 2:
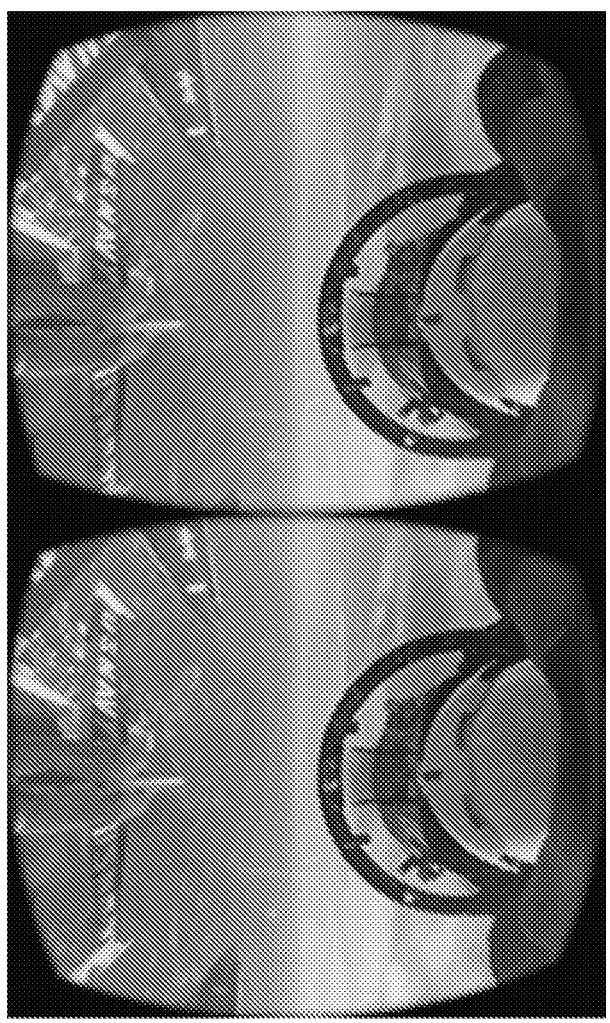
FIG. 2 depicts an example portion of 360° video displayed on a head mounted device (HMD).

FIG. 2 depicts an example portion of 360° video displayed on a head mounted device (HMD). When looking around or zooming, the part of the 360° video presented to the user may change based on the feedback provided by the HMD or other types of user interface (e.g., smartphones). A viewpoint may include a spatial region of the entire 360° video. A viewpoint may be fully or partially presented to the user and may have different quality than other parts of the 360° video.

Devices capable of streaming 360 degree video may be classified in certain major categories: devices that may use a HMD for an immersive experience (e.g., Oculus Rift, HTC Vive, Samsung Gear VR), or devices that display a viewport of the 360 degree video (e.g., Cardboard, YouTube and Facebook apps for Android and iOS smartphones). User's head orientation may be determined. For example, sensors in the HMD and additional tracking device(s) may be used to determine user's head orientation during playback. For example, sensors in the smartphone may be used to obtain such information. Orientation information may be obtained frequently. For example, orientation information may be obtained every time a frame has been decoded and it is ready to be shown on the display. This may allow the client to closely track orientation and to reduce lag between orientation changes and viewport displayed on the screen.

Figure 3:
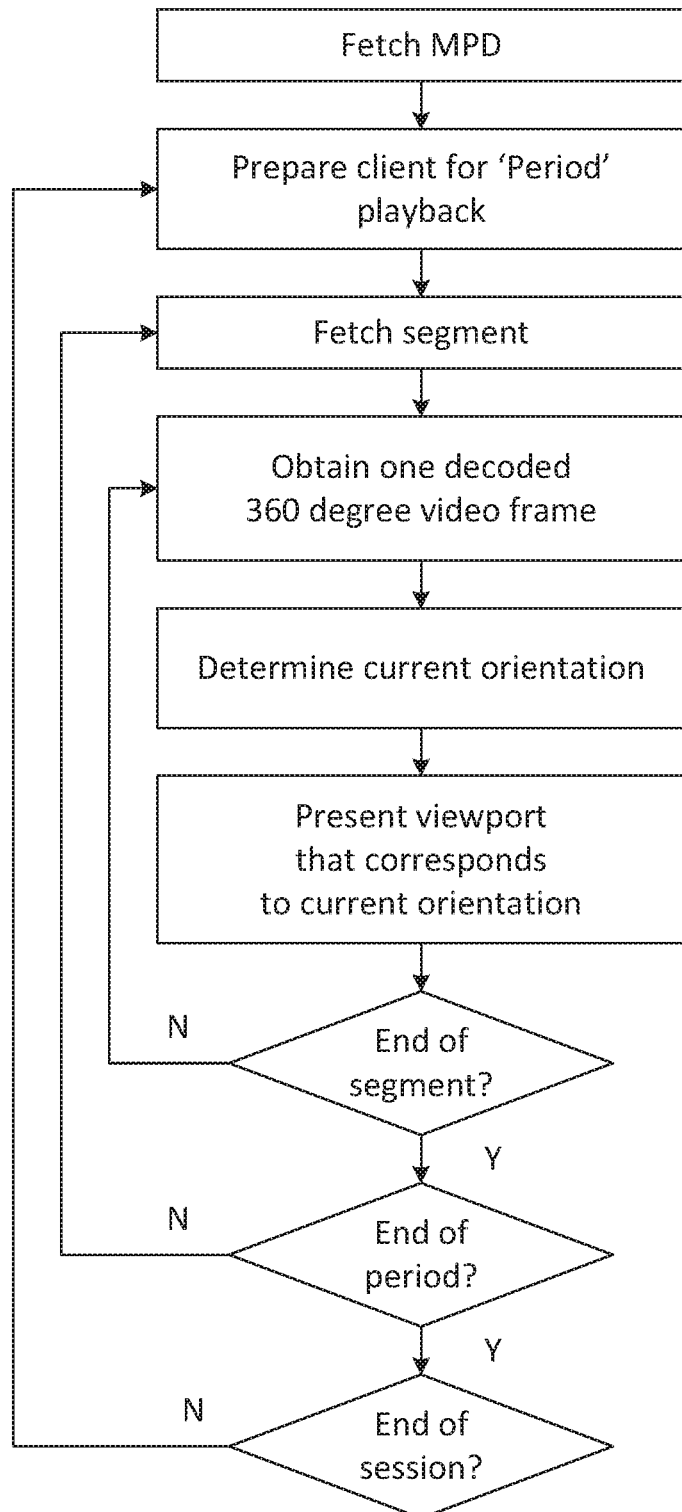
FIG. 3 shows a simplified example method for presenting 360 degree video based on orientation.

FIG. 3 shows a simplified example method for presenting 360 degree video. As shown, after fetching and parsing the session's MPD, media playback may occur one 'Period' at a time. For a 'Period', segments may be fetched. After decoding the 360 degree video frames, the current orientation may be determined. The orientation information may be used to present the viewport that may correspond to the current orientation.

Secondary content, such as advertisement, educational information, gaming information, may be included in the 360 degree video. Advertising may be a source of revenue for streaming video. In online video, advertisements may be shown before (pre-roll), during (mid-roll) and after (post-roll) some video content is presented to the user. Ads may be inserted (or "spliced") into the main content or presentation. Ad breaks (e.g., "avails") may include points in time during a video streaming session where one or more ads may be spliced. While content insertion is described herein in the context of ad insertion, it shall be appreciated that the technology described herein may apply other content insertion such as information or video content related to a product showcased in the main video, educational or training videos (e.g., after completing a class, a set of new topics may be given to user), video games (e.g., game play may adapt to challenges that user enjoys the most), video library browsing (e.g., suggesting related titles based on whether user likes to actively look around, or whether user enjoys a more quiet viewing experience) or the like.

A secondary content decision server, such as an ad decision server, may decide whether to present secondary content. If secondary content is to be presented, which secondary content may be presented during a secondary content presentation period, such as an ad break, may be determined. For example, an ad server may serve ad content to streaming clients. An ad decision server may or may not be on the same physical server as the ad server.

Ads may be seamlessly inserted (e.g., spliced) via digital "cue messages". Cue messages may be used to indicate time (e.g., presentation start time) and parameters (e.g., length) of an upcoming ad break. For example, cue messages may be sent in advance of the start time of the ad (e.g., 6 and 2 seconds before) and of the resume time of the main content, allowing streaming clients to prepare for splicing media streams. Cue messages may be sent in-band (e.g., in 'emsg' boxes within media segments) or out-of-band (e.g., in the MPD as user-defined events).

When a video ad is presented, there may be certain rules for the streaming client that may alter user's control of the playback. For example, users may be prevented from skipping or fast-forwarding through the ad, thus ensuring that the user sees the ad (all or part of the ad).

Advertisers may use the capabilities of modern video streaming techniques for targeted advertising. For example, ads may be customized based on users' interests, demographic information or viewing habits. For example, IP address, geo-location, HTTP cookies, web beacons, unique device token (a.k.a., device ad identifier), user login state to sites such as Google and Facebook, device graphs (non-personal information used to track site interaction across multiple devices), etc. may be used for targeted advertising.

Ads may be inserted in DASH video streaming. For example, a DASH client may operate in an WTRU as described herein. The WTRU may be or may include a DASH client device. A DASH client may playback content and ads listed in the MPD. For example, ad servers may decide which advertisement content should be presented to streaming clients.

Figure 4:
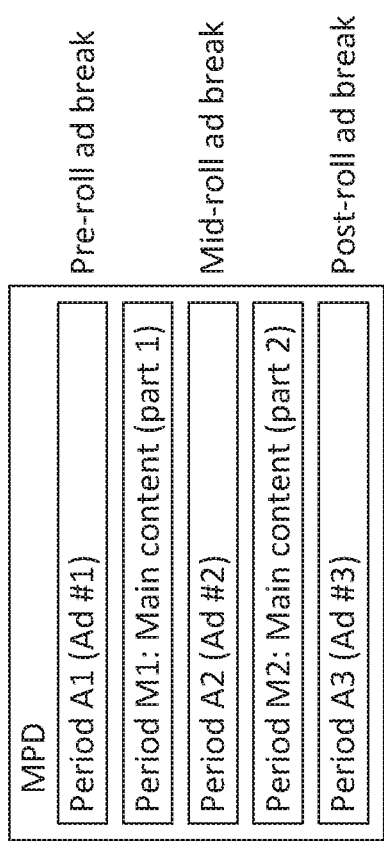
FIG. 4 shows an example streaming video session with pre-, mid and post-roll ads.

Main content and ad playback may be predetermined in DASH. For example, a streaming session may include a mix of main content and ads. The MPD fetched by streaming clients may list a number of DASH Periods, where a Period may represent main content or an ad. Ads to be shown and the order in which they are shown may be pre-determined by the content provider at the time of MPD generation. A main presentation may be partitioned into multiple periods, and multiple ads may be shown in an ad break. A simple example of a two-part main presentation, with pre-, mid- and post-roll ads, is shown in FIG. 4.

TABLE 1

Simplified sample MPD of a video session with pre-, mid- and post-roll ads.

```
<MPD>
 <!-- Ad_#1, pre-roll -->
 <Period id="Ad_1">
  <AdaptationSet mimeType="video/mp4" codecs="avc1.42c01e"
segmentAlignment="true">
     <Representation @id="0" width="1920" height="1080" bandwidth="127597">
      <BaseURL>ad_pre_roll.mp4</BaseURL>
     </Representation>
   </AdaptationSet>
 </Period>
 <!-- Main presentation, part 1 -->
 <Period id="Main_part_1">
  <AdaptationSet mimeType="video/mp4" codecs="avc1.42c01e"
segmentAlignment="true">
     <Representation @id="0" width="1920" height="1080" bandwidth="226597">
      <BaseURL>Main_content_part_1.mp4</BaseURL>
     </Representation>
   </AdaptationSet>
 </Period>
 <!-- Ad_#2, mid-roll -->
 <Period id="Ad_2">
  "AdaptationSet mimeType="video/mp4" codecs="avc1.42c01e"
segmentAlignment="true">
     <Representation @id="0" width="1920" height="1080" bandwidth="127597">
      <BaseURL>ad_mid_roll.mp4</BaseURL>
     </Representation>
   </AdaptationSet>
 </Period>
 <!-- Main presentation, part 2 -->
 <Period id="Main_part_2">
  <AdaptationSet mimeType="video/mp4" codecs="avc1.42c01e"
segmentAlignment="true">
     <Representation @id="0" width="1920" height="1080" bandwidth="226597">
      <BaseURL>Main_content_part_2.mp4</BaseURL>
     </Representation>
   </AdaptationSet>
 </Period>
 <!-- Ad_#3, post-roll -->
 <Period id="Ad_3">
  <AdaptationSet mimeType="video/mp4" codecs="avc1.42c01e"
segmentAlignment="true">
     <Representation @id="0" width="1920" height="1080" bandwidth="127597">
      <BaseURL>ad_post_roll.mp4</BaseURL>
     </Representation>
   </AdaptationSet>
 </Period>
</MPD>
```

A system may create a custom MPD for a streaming client (or for a group of streaming clients). The MPD may be updated during a streaming session. For example, synchronous updates may be performed via the 'minimumUpdatePeriod' element on the MPD, which may indicate to the client that it should re-fetch the MPD periodically (e.g., twice per minute). Asynchronous updates may be triggered by one or more events, prompting streaming clients to update their MPD(s). Such event may include, but not limited to, MPD validity expiration event (e.g., where MPD may be re-fetched upon reaching the expiration time), MPD patch (e.g., where a patch may be applied to the MPD already fetched by the client), and MPD update event (where an entirely new MPD may be re-fetched). Events may be indicated in the MPD (e.g., using the 'InbandEventStrean' element) or in-band (e.g., as ISO-BMFF boxes of type 'emsg').

The streaming clients may communicate with a secondary content server for secondary content insertion. For example, ad(s) may be resolved during playback, with an ad corresponding to a new 'Period' element in the MPD. Streaming clients may use MPD update and/or remote new 'Periods' for obtaining 'Periods' with ads.

Figure 5:
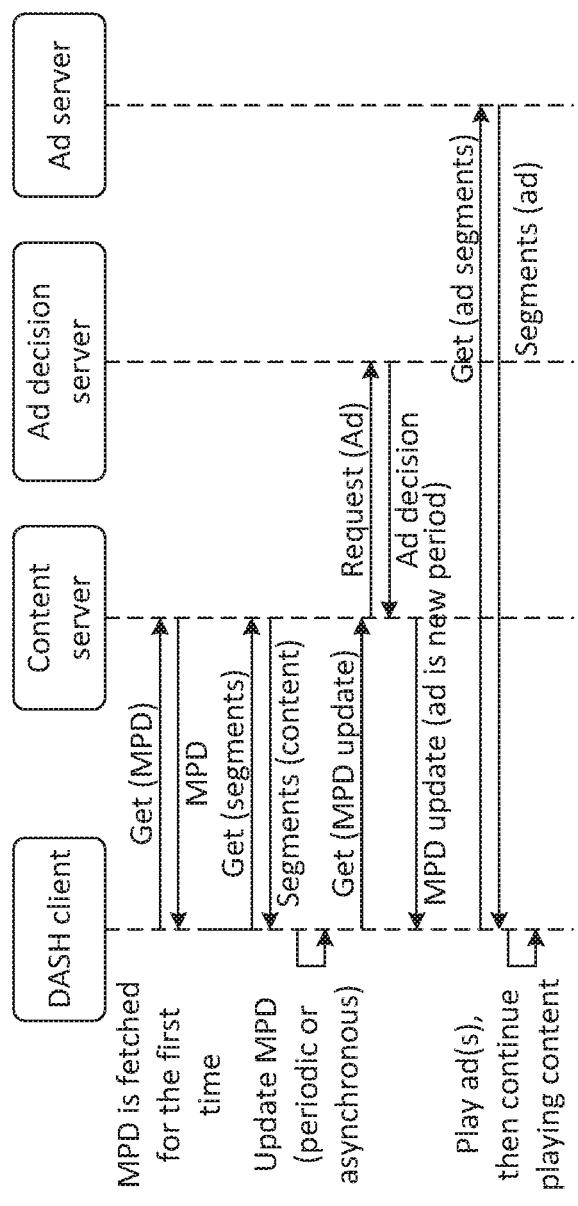
FIG. 5 shows an example server-based ad insertion using MPD update.

FIG. 5 shows an example server-based ad insertion using MPD update. An updated MPD may be fetched by the client (e.g., synchronously and/or asynchronously) to determine new period(s) that correspond to ad(s). Multiple ads may result in multiple periods. After the ads have been shown, a new period may be used to continue presenting the main content. A call flow of ad insertion using MPD update is shown in FIG. 5. The MPD may be updated one or more times during playback. As described herein, the MPD may be updated periodically (synchronous), and/or when a DASH event occurs or when the MPD expires (asynchronous). A sample MPD before update is shown in Table 2. As shown, the client may update its MPD every 10 seconds. A sample MPD after update is shown in Table 3.

TABLE 2

Simplified example MPD before ad insertion update.

```
<MPD ... minimumUpdatePeriod="PT10S">
    <!-- This is the first part of the main content. -->
    <Period start="PT0.00S" duration="PT150.0S" id="movie_period_1">
        <AdaptationSet mimeType="video/mp4" codecs="avc1.640828" ... >
            <BaseURL>video_1/</BaseURL>
            <SegmentTemplate initialization="$Bandwidth%/init.mp4v" ... />
            <Representation id="v0" width="320" height="240" bandwidth="250000"/>
            <Representation id="v1" width="640" height="480" bandwidth="500000"/>
        </AdaptationSet>
    </Period>
    <!-- An ad will be inserted here after MPD is updated. -->
    <!-- This is the second part of the main content. -->
    <Period duration="PT150.0S" id="movie_period_2">
        <AdaptationSet mimeType="video/mp4" codecs="avec1.640828" ... >
            <BaseURL>video_2/</BaseURL>
            <Segment Template initialization="$Bandwidth%/init.mp4v" ... />
            <Representation id="v0" width="320" height="240" bandwidth="250000"/>
            <Representation id="v1" width="640" height="480" bandwidth="500000"/>
        </AdaptationSet>
    </Period>
</MPD>
```

TABLE 3

Simplified example MPD updated for ad insertion.

```
<MPD ... minimumUpdatePeriod="PT10S">
    <!-- This is the first part of the main content. -->
    <Period start="PT0.00S" duration="PT150.0S" id="movie_period_1">
        <AdaptationSet mimeType="video/mp4" codecs="avec 1.640828" ... >
            <BaseURL>video_1/</BaseURL>
            <SegmentTemplate initialization="$Bandwidth%/init.mp4v" ... />
            <Representation id="v0" width="320" height="240" bandwidth="250000"/>
            <Representation id="v1" width="640" height="480" bandwidth="500000"/>
        </AdaptationSet>
    </Period>
    <!-- After update, a new ad period is added to the MPD -->
    <!-- New period added after update: Mid-roll advertisement -->
    <Period duration="PT30.00S" id="ad_break_1">
        <AdaptationSet mimeType="video/mp4" codecs="avc1.42c01e"
            <BaseURL>ad_campaign_1/</BaseURL>
            <SegmentTemplate initialization="$Bandwidth%/init.mp4v" ... />
            <Representation @id="ad0" width="320" height="240" bandwidth="127597">
        </AdaptationSet>
    </Period>
    <!-- This is the second part of the main content -->
    <Period duration="PT150.0S" id="movie_period_2">
        <AdaptationSet mimeType="video/mp4" codecs="avc1.640828" ... >
            <BaseURL>video_2/</BaseURL>
            <SegmentTemplate initialization="$Bandwidth%/init.mp4v" ... />
            "Representation id="v0" width="320" height="240" bandwidth="250000"/>
            <Representation id="v1" width="640" height="480" bandwidth="500000"/>
        </AdaptationSet>
    </Period>
</MPD>
```

A remote 'Period' may be used for updating MPD. Remote periods in an MPD may include an xlink attribute with the information such as the URL from which the period information may be fetched and/or the time at which the period information may be fetched. For example, the time at which the period information may be fetched may include "on load," at the time the MPD is parsed and/or "on request," when the client may need the information about the remote period.

Figure 6:
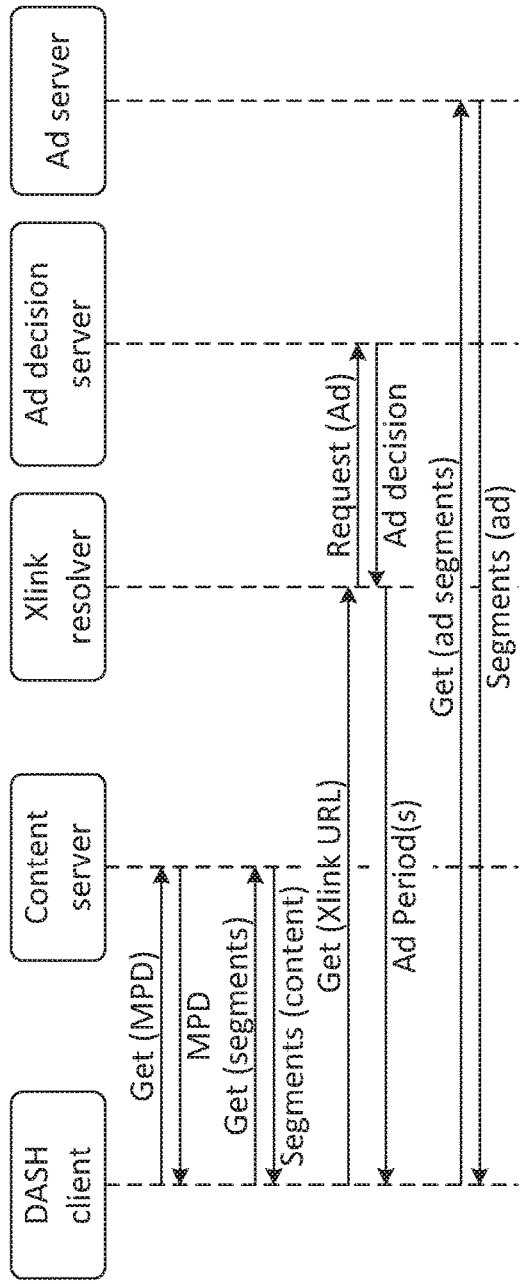
FIG. 6 shows an example DASH presentation with ad insertion using remote periods.

FIG. 6 shows an example call flow of ad insertion using remote periods. The ad decision server may receive a request from the client, containing information about the main content that the client is playing back (e.g., using cue messages or using a DASH AssetIdentifier' descriptor), enabling the ad decision server to select an ad that corresponds to the content. The response to the 'xlink' request may be a 'Period' if one ad is shown, or multiple 'Periods' if more than one ad is shown. The MPD may contain default content in case the remote period cannot be resolved (e.g., ad decision server is busy or offline).

An ad decision server may customize the selected ad(s) based on information known about the requesting client. The client may include in the HTTP request information about the user (e.g., gender and age), or the ad server may get information about the client from the request context (e.g., cookies or device ad identifiers in the HTTP request). For example, an ad agency may be running an ad campaign to promote a new product to young viewers watching some shows or videos online. Table 4 shows an example MPD of a presentation with ad insertion using remote periods.

TABLE 4

Example MPD of a DASH presentation with ad insertion using remote periods

```
<MPD>
    <!-- Movie -->
    <Period start="PT0.0S" duration="PT600.6S" id="movie_period_1">
        <AdaptationSet mimeType="video/mp4" codecs="avc1.640828" ... >
            <BaseURL>video_1/</BaseURL>
            <SegmentTemplate initialization="$Bandwidth%/init.mp4v" ... />
            <Representation id="v0" width="320" height="240" bandwidth="250000"/>
            <Representation id="v1" width="640" height="480" bandwidth="500000"/>
        </AdaptationSet>
    </Period>
    <!-- Mid-roll advertisement, passing base64url-coded SCTE 35 to XLink resolver -->
    <Period duration="PT60.0S" id="ad_break_1"
        xlink:href="https://adserv.com/avail.mpd?scte35-time=PT600.6S&scte35-
cue=DAIAAAAAAAAAAAQAAZ_I0VniQAQAgBDVUVJQAAAAH+cAAAAAA%3D%3
D"
        xlink:actuate="onRequest" >
        <!-- Default content, replaced by elements from remote entity -->
        <AdaptationSet mimeType="video/mp4" codecs="avc1.640828" ... >
            <BaseURL availabilityTimeOffset="INF">default_ad/</BaseURL>
            <SegmentTemplate initialization="$Band-width%/init.mp4v" ... />
            <Representation id="v0" width="320" height="240" bandwidth="125000"/>
        </AdaptationSet>
    </Period>
    <!-- Movie, cont'd -->
    <Period duration="PT600.0S" id="movie_period_2">
        <AdaptationSet mimeType="video/mp4" codecs="avc1.640828"
            <BaseURL>video 2/</BaseURL>
            <SegmentTemplate initialization="$Bandwidth%/init.mp4v" ... />
            <Representation id="v0" width="320" height="240" bandwidth="250000"/>
            <Representation id="v1" width="640" height="480" bandwidth="500000"/>
        </AdaptationSet>
    </Period>
</MPD>
```

An ad may be represented by a separate MPD. The client may contact the ad decision server to determine the content to be played when a cue message is received. As described herein, cue messages may be listed in the MPD as user-defined events (in an EventStream element within a Period element) and/or may be sent in-band in 'emsg' boxes within media segments.

Figure 7:
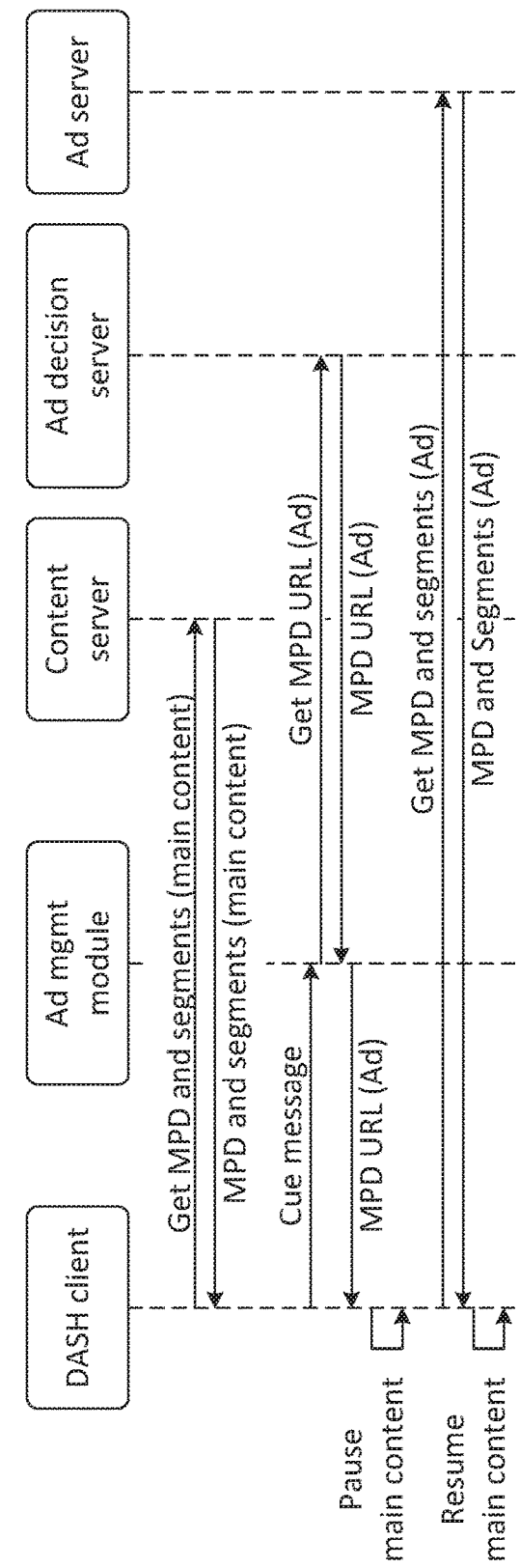
FIG. 7 shows an example call flow for DASH presentation with ad insertion in an app-based architecture.

FIG. 7 shows an example call flow for DASH presentation with ad insertion in an app-based architecture. Upon receiving a cue message, the client may pass the cue information to an ad management module. The ad management module may communicate with the ad decision server to obtain a new MPD URL for the ad. Cue information may identify the content being played back by the client. The request sent to the ad decision server may include information about the client (e.g., viewing habits) and its context (e.g., HTTP cookies or device ad identifiers), enabling the ad decision server to select an appropriate ad. The DASH client may get the ad MPD containing an ad period, pause presentation of main content, and start presenting the ad. Upon completion, the client may resume presentation of main content, e.g., as shown in the call flow in FIG. 7. If multiple ads are shown, multiple URLs may be obtained from the ad decision server, and/or the ad MPD may contain multiple periods.

360 degree video type and projection method may be signaled. Common attributes may be specified for AdaptationSet, Representation, or Sub-Representation. The @videoType attribute may indicate the video type such as spherical video, light field video or rectilinear video. For spherical video, different projection formats and/or projection+layout combinations, such as equirectangular, cube-map (in combination with different layouts) and pyramid map can be signaled as Common attribute @(projection and @ layout for AdaptationSet, Representation, and/or Sub-Representation elements. Tables 5-8 shows example syntax of the '@videoType'. '@projection' and '@layout' attributes.

TABLE 5 example common attributes and elements

| Element or Attribute Name | Use | Description |
|---|---|---|
| Common attributes and elements | | |
| @videoType | O | May specify the video type in the form of an integer as specified in Table 6. If not present, the value is inferred to be "rectilinear". |
| @projection | O | May specify the projection method used to project omnidirectional video into rectilinear video frame as specified in Table 6. If @videoType is equal to 2, the value of @projection is specified in Table 7. |
| @layout | O | May specify the layout of projected omnidirectional video in the form of an integer. The value of @layout is specified in Table 8. |

TABLE 6 example value of @videoType

| Value | Geometry Type |
|---|---|
| 0 | Rectilinear video |
| 1 | Panorama video |
| 2 | Spherical video |
| 3 | Lightfield video |
| . . . | . . . |

TABLE 7 example value of @projection

| Value | Geometry Type |
|---|---|
| 0 | Equirectangular |
| 1 | Cube |
| 2 | Offset cube |
| 3 | Squished sphere |
| 4 | Pyramid |
| 5 | Cylinder |
| ... | ... |

TABLE 8 example value of @layout

| @projection | @layout | Layout format |
|---|---|---|
| 0 | 0 | Plate carree |
|   | 1 | Poles on the side (half height) |
|   | 2 | Poles on the side (full height) |
| 1 | 3 | Single row |
|   | 4 | 2 × 3 |
|   | 5 | 180° |
| ... | ... | ... |

The projection method used by the main content and ads may be different. For example, the main content may use cubemap. Some ads may use equirectangular and other ads may use pyramid projection. Table 9 shows a sample MPD of a 360 degree video presentation with a pre-roll and a post-roll ad. An ad may use a video type and/or projection method different from the main presentation.

TABLE 9

Sample simplified MPD of a 360 degree video presentation with advertisements.

```
<?xml version="1.0" encoding="UTF-8"?>
<MPD>
 <ProgramInformation>
  <Title>Example of a 360 degree video DASH Media Presentation Description
    with pre- and post-roll advertisements</Title>
 </ProgramInformation>
 <!-- 360 degree Ad 1, pre-roll. Video type is equirectangular. -->
 <Period id="Ad_1">
  "AdaptationSet mimeType="video/mp4" ... videoType=2>
    <Representation @id="0" width="4096" height="2048" bandwidth="327597">
     <BaseURL>360_degree_ad pre_roll.mp4</BaseURL>
    </Representation>
  </AdaptationSet>
 </Period>
 <!-- 360 degree Main presentation. Video type is cubemap 2x3. -->
 <Period id="Main">
  "AdaptationSet mimeType="video/mp4" ... videoType=2 projection=1 layout=1>
    <Representation @id="0" width="4096" height="2048" bandwidth="626597">
     <BaseURL>360 degree_main_content.mp4</BaseURL>
    </Representation>
  </AdaptationSet>
 </Period>
 <!-- 360 degree Ad 2, post-roll. Video type is pyramid. -->
 <Period id="Ad_2">
   <AdaptationSet mimeType="video/mp4" ... videoType=2 projection=4>
    <Representation @id="0" width="4096" height="2048" bandwidth="327597">
     <BaseURL>360_degree_ad_post_roll.mp4</BaseURL>
    </Representation>
   </AdaptationSet>
 </Period>
</MPD>
```

360 degree video may or may not be 360 degrees. For example, as used herein a 360 degree video may include spherical video, virtual reality (VR) video, panorama video, omnidirectional video, and/or immersive video such as light field video (e.g., 6 degree of freedom) and point cloud video. Secondary content may or may not be 360 degree video. For example, secondary content may include 2D video and/or a mix of 2D or rectilinear video and 360 degree video content.

A secondary content may be inserted based on users' interests in 360 degree video streaming. 360 degree video may allow content producers to present scenes where multiple areas may call the attention of viewers. Users may have different interests and may watch different areas within a 360 degree video. Secondary content viewports may be used to indicate certain areas of interests within a 360 degree video. For example, an ad viewport may be a secondary content viewport that may be used to indicate certain areas of interests within a 360 degree video to facilitate ad insertions. The information about area(s) of 360 degree scenes that users watch the most may be used to select secondary content(s), such as an ad(s), product information, background information, relevant to their interests.

Figure 8:
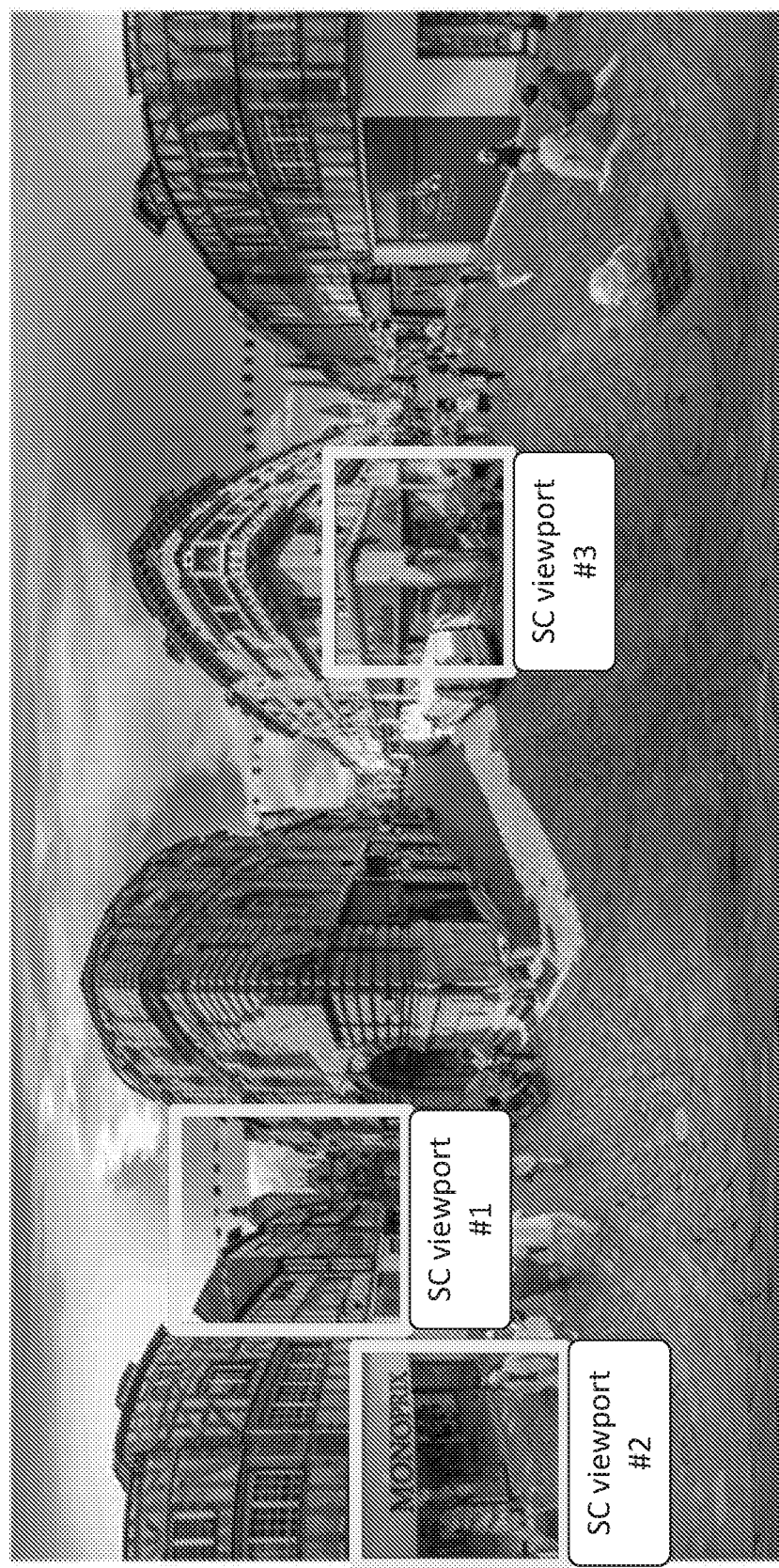
FIG. 8 shows example secondary content viewport definitions within a 360 degree video.

FIG. 8 shows example secondary content viewport definitions within a 360 degree video frame. It shows a street scene in a 360 degree video with three secondary content viewports: secondary content viewport #1 defines an area that contains an architecturally interesting building; secondary content viewports #2 and #3 define areas that contain stores. While watching this video, some users may be interested in building architecture (SC viewport #1), whereas others may, be interested in stores and shopping (SC viewports #$2$ and #3). The streaming client may keep statistics of the user's head orientation for some time leading to the presentation of the secondary content. Secondary content, such as ad content, may be determined based on user's viewing statistics of the secondary content viewport(s). For example, with this information (and/or other information such as viewing habits, user profile, etc.), an ad decision server may decide to show the first group of users an ad about travel, while it may show the second group an ad about shopping. A streaming client (e.g., video streaming client), as used herein, may include a DASH client application, a DASH compliant video streaming application, a video streaming device such as the WTRU as described herein, and/or any other application or device that may render video data.

Secondary content viewport parameter(s) may be tracked for the secondary content viewport(s) in the 360 degree video. Secondary content viewport parameters may include statistics of user's head orientation. Statistics of user's head orientation may be collected over the entire streaming session, over a particular period, or over specific time intervals. Secondary content viewport information may be determined based on the user's head orientation statistics. Secondary content viewport information may include the locations of the secondary content viewports and their respective secondary content viewport identifiers.

A secondary content viewport location may be indicated via a horizontal and/or vertical position of a reference point (e.g., top left corner) of the secondary content viewport, and/or a width and/or height of the secondary content viewport. Various MPD elements such as descriptor or event at MPD level, Period level or the Adaptation Set level may be used to activate the tracking of user's head orientation statistics information.

The client may track secondary content viewport parameter(s), for example, based on user orientation statistics and/or secondary content viewport information, to make secondary content insertion decisions. The client may pass secondary content viewport statistics to another module on the device for app-based ad insertion. The client may send back secondary content viewport statistics and/or secondary content viewport information to the secondary content decision server for server-based secondary content insertion. The secondary content decision server may update the MPD by inserting the corresponding secondary content based on orientation statistics and/or secondary content viewport information. For example, the secondary content decision server may select different advertisements for users that viewed different secondary content viewports as shown in FIG. 8. For example, the secondary content decision server may select different advertisements for display in different secondary content viewports shown in FIG. 8.

A location for inserting secondary content may be determined based on secondary content viewport information. Most viewed secondary content viewport(s) may be determined based on user orientation statistics. For example, the streaming client may send orientation statistics to an ad tracking server to identify the most viewed areas of a 360 degree video. This data may be aggregated and, may be used to auction the most viewed ad viewports(s) at higher price, or to link high profit ads to multiple secondary content viewports to increase hit rate.

FIG. 9 shows an example process for enabling ad insertion based on users' interests and secondary content viewports in 360 degree video streaming. As shown, information associated with secondary content viewport may be signaled. Statistics related to secondary content viewport(s) may be kept. Statistics of user's head orientation over a 'Period', part of a 'Period' and/or over the entire streaming session may be recorded. Statistics over part of a period may be used for ad insertion, for example if viewing of a secondary content viewport lasts for a limited amount of time. Statistics over an entire streaming session may be used to identify areas of a 360 video that are most interesting to users. Secondary content decisions may be made based on the statistics. Statistics related to secondary content viewport(s) may be reported.

While the description of secondary content viewports herein is provided in the context of a DASH streaming system, the concepts described may also be achieved by other means in a streaming system. For example, secondary content viewport signaling may be provided to the client using one or more of metadata obtained from other modules in the system (e.g., from a remote server), metadata that may be embedded in the media files received from the content server (e.g., within the free space ('free' or 'skip') box of the ISO-BMFF), or out-of-band means (e.g., using a control channel) where secondary content viewport information may be obtained by the client from the content server or other modules in the streaming system.

Secondary content viewport information may be sent using DASH signaling in a DASH streaming system. FIG. 10 shows example DASH signaling for secondary content insertion using secondary content viewports. As shown, a streaming client may receive a request to track secondary content viewport viewing parameter(s) such as viewing statistics. The secondary content viewport position(s) and time for tracking viewing parameter(s) related to the secondary content viewport(s) may be determined based on the request. Relations between secondary content viewports and secondary contents for potential insertion may be determined Secondary content viewport viewing parameter(s) may be reported.

For example, an indication to start keeping statistics during an entire period may be sent to a client. The indication may include one or more of, but not limited to, an 'InbandEventStream' element, an 'EventStream' element, a 'SupplementalProperty' element and/or the like. The 'InbandEventStream' and 'SupplementalProperty' elements may be associated with 'AdaptationSet'. The element 'EventStream' may be associated with 'Period'. In response to receiving the indication to start keeping statistics during an entire period, the client may start to keeping statistics during the entire period of the video.

An 'InbandEventStream' element may be used to indicate to the client that it is to start tracking secondary content viewport parameter(s). The 'orientation stats keep' scheme shown in Table 10 may be used to specify this signal. Keeping statistics may start at the beginning and may stop at the end of the containing Period element. A simplified example MPD using 'InbandEventStream' to indicate keeping statistics over a 'Period' is shown in Table 11.

TABLE 10

Example 'Orientation stats keep' scheme for 'InbandEventStream'.

| Element or Attribute Name | Description |
| --- | --- |
| InbandEventStream | |
| @schemeIdUri | urn:mpeg:dash:orientationstatskeep:2016 |

TABLE 11

Simplified example MPD signaling 'orientation stats keep' over a 'Period' using 'InbandEventStream'.

```
<MPD>
 <Period>
  <AdaptationSet>
   <!-- Keep statistics of user's head orientation over duration of this period -->
   <InbandEventStream schemeIdUri="urn:mpeg:dash:orientationstatskeep:2016" />
   ...
  </AdaptationSet>
  ...
 </Period>
</MPD>
```

An 'EventStream' element may be used to indicate to the client that it is to start keeping statistics. The 'EventStream' elements may be used at the 'Period' level. The 'InbandEventStream' elements may be associated with 'AdaptationSet' or 'Representation' elements. The example 'orientation stats keep' scheme shown in Table 12 may be used to specify this signal. Due to the scope of 'EventStream', statistics collection may start at the beginning and may stop at the end of the containing 'Period' element. A simplified example MPD using 'EventStream' to indicate keeping statistics over a 'Period' is shown in Table 13.

TABLE 12

Example 'Orientation stats keep' scheme for 'EventStream'.

| Element or Attribute Name | Description |
|---|---|
| EventStream | |
| @schemeIdUri | urn:mpeg:dash:orientationstatskeep:2016 |

TABLE 13

Simplified example MPD signaling 'orientation stats keep' over a 'Period' using 'EventStream'

```
<MPD>
 <Period>
  <!- Keep statistics of user's head orientation over duration of this period -->
  <EventStream schemeIdUri="urn:mpeg:dash:orientationstatskeep:2016" />
  <AdaptationSet> ... </AdaptationSet>
  ...
 </Period>
</MPD>
```

The 'SupplementalProperty' element may be used to indicate to the client that it is to start keeping statistics. An 'orientation statskeep' scheme may specify this signal. The SupplementalProperty descriptor with @schemeIdUri equal to "urn:mpeg:dash:orientationstatskeep:2016", shown in Table 14, may indicate that keeping statistics may start at the beginning and may stop at the end of the containing Period element. A simplified example MPD using 'SupplementalProperty' to indicate keeping statistics over a 'Period' is shown in Table 15.

TABLE 14

Example 'Orientation stats keep' scheme for 'SupplementalProperty'

| Element or Attribute Name | Description |
|---|---|
| SupplementalProperty | |
| @schemeIdUri | urn:mpeg:dash:orientationstatskeep:2016 |

TABLE 15

Simplified sample MPD signaling 'orientation stats keep' over a 'Period' using 'SupplementalProperty'.

```
<MPD>
 <Period>
  <AdaptationSet>
   <!-- Keep stats of user's head orientation over the duration of this period -->
   <SupplementalProperty schemeIdUri="urn:mpeg:dash:orientationstatskeep:2016" />
   ...
  </AdaptationSet>
  ...
 </Period>
</MPD>
```

An indication to start keeping statistics over part of a period may be sent to a client. The indication may include one or more of, but not limited to, an 'InbandEventStream' element, an 'EventStream' element, and/or the like. The 'InbandEventStream' and 'SupplementalProperty' elements may be associated with 'AdaptationSet'. In response to receiving the indication to start keeping statistics, the client may keep statistics during specific part of the period of video streaming session.

Keeping statistics during a particular part of a period may be signaled to streaming clients using an 'InbandEventStream' element. The 'orientation stats keep' scheme shown in Table 16 may be used to specify this signal. The attributes in the 'InbandEventStream' and its child 'Event' element may be used to indicate the part of the period where statistics may be kept. For the 'orientation stats keep' scheme, the attributes listed below may be used.

TABLE 16

Example use of 'InbandEventStream' for keeping statistics during part of a period

| Element or Attribute name | Use | Description |
| --- | --- | --- |
| InbandEventStream | | |
| @schemeIdUri | | May specify event stream Value may be: 'urn:mpeg:dash:orientationstatskeep:2016' |
| @timescale | | May specify the timescale in units per seconds to be used for the derivation of different real-time duration values in the Event elements. |

TABLE 16-continued

Example use of 'InbandEventStream' for keeping statistics during part of a period

| Element or Attribute name | Use | Description |
| --- | --- | --- |
| Event | 1 . . . N | May specify one event. (e.g., as shown in Table 17). |

Legend:
For elements: <minOccurs> . . . < maxOccurs> (N = unbounded)
Elements are bold; attributes are non-bold and preceded with an @.

TABLE 17

Example 'Event' semantics for ad viewports

| Element or Attribute name | Use | Description |
| --- | --- | --- |
| Event | | May specify event stream |
| @presentationTime | M | May specify the presentation time of the event relative to the start of the Period |
| @duration | M | May specify the presentation duration of the event |
| @id | M | May specify the id of the secondary content viewport that corresponds to this event |

The value of the '@presentationTime' and '@duration' attributes in seconds may be obtained by dividing the value of these attributes by the value of the @timescale attribute. Multiple 'Event' elements may be used to keep statistics multiple times over the duration of a 'Period'.

TABLE 18

Simplified example MPD signaling 'orientation stats keep' over part of a 'Period'.

```
<MPD>
 <Period>
  <AdaptationSet>
   <!-- Start keeping statistics user's head orientation 20 seconds after
      the beginning of the Period. Keeping statistics over 10 seconds. -->
   <InbandEventStream schemeIdUri="urn:mpeg:dash:orientationstatskeep:2016"
timescale="1000">
    <Event presentationTime="20000" duration="10000" id="viewport_1" />
   </InbandEventStream>
   ...
  </AdaptationSet>
  ...
 </Period>
</MPD>
```

Keeping statistics during part of a period may be signaled to streaming clients using an 'EventStream' element. The 'orientation stats keep' scheme shown in Table 19 may specify this signal, and attributes in the 'EventStream' and its child 'Event' element may indicate the part of the period where keeping statistics is to take place. For the 'orientation stats keep' scheme, the attributes listed below are used.

TABLE 19

Example use of 'EventStream' for keeping statistics during part of a period

| Element or Attribute name | Use | Description |
| --- | --- | --- |
| EventStream | | May specify event stream |
| @schemeIdUri | | Value may be: 'urn:mpeg:dash:orientationstatskeep:2016' |
| @timescale | | May specify the timescale in units per seconds to be used for the derivation of different real-time duration values in the Event elements. |
| Event | 1 . . . N | May specify one event. For details see Table 20. |

Legend:
For elements: <minOccurs> . . . <maxOccurs> (N = unbounded)
Elements are bold; attributes are non-bold and preceded with an @.

TABLE 20

Example 'Event' semantics for secondary content viewports

| Element or Attribute name | Description |
| --- | --- |
| Event | May specify event stream |
| @presentationTime | May specify the presentation time of the event relative to the start of the Period |
| @duration | May specify the presentation duration of the event |
| @id | May specify the id of the secondary content viewport that corresponds to this event |

The value of the '@presentationTime' and '@duration' attributes in seconds may be the division of the value of these attributes and the value of the a timescale attribute. Multiple 'Event' elements may be used to keep statistics multiple times over the duration of a 'Period'.

The '@id' attribute may identify the secondary content viewport associated with the 'Event'. The '@id' attribute may be used to match multiple 'Event' elements to multiple 'AdaptationSet' elements within a 'Period'. For example, when the same 360 degree video is available in multiple different projections, '@id' attribute may be used to match multiple 'Event' elements to multiple 'AdaptationSet' elements within a 'Period'. A simplified example MPD using 'EventStream' to indicate keeping statistics over a 'Period' is show n in Table 21.

TABLE 21

Simplified example MPD signaling 'orientation stats keep' over part of a 'Period'

```
<MPD>
 <Period>
  <!-- Start keeping statistics user's head orientation 20 seconds after
    the beginning of the Period. Keeping statistics over 10 seconds. -->
  <EventStream schemeIdUri="urn:mpeg:dash:orientationstatskeep:2016" timescale="1000">
   <Event presentationTime="20000" duration="10000" id="viewport_1" />
  </EventStream>
  <AdaptationSet> ... </AdaptationSet>
  ...
 </Period>
</MPD>
```

Statistics of user's head orientation over an entire streaming session may be kept. A 'InbandEventStream' element with a @schemeIdUri equal to "urn:mpeg:dash:orientationstatskeep:2016", e.g., as shown in Table 10, within a 'MPD' element may be used to indicate that keeping statistics may start at the beginning and may stop at the end of the video streaming session. A simplified MPD showing the use of this approach is shown in Table 22.

TABLE 22

Simplified example MPD signaling 'orientation stats keep' for an entire DASH streaming session

```
<MPD>
 <!-- Keep statistics of user's head orientation over duration of this session -->
 <InbandEventStream schemeIdUri="urn:mpeg:dash:orientationstatskeep:2016" />
 <Period> ... </Period>
 ...
 <Period> ... </Period>
</MPD>
```

The streaming client may determine secondary content viewport positions based on the received request. The areas in the 360 degree video that are secondary content viewports may be specified via signaling. Secondary content viewports may be specified over an entire period, over part of a period, or over an entire streaming session.

While the description herein is provided for 360 degree video in equirectangular projection, the concepts described here also apply if other projections (e.g., cubemap) are used. Similarly, while the description herein is provided for a rectangular coordinate system, the concepts described herein also apply if other coordinate systems (e.g., spherical) are used.

Secondary content viewports may be specified over an entire 'Period.' For example, secondary content viewports specified over an entire period may be signaled to streaming clients using a 'SupplementalProperty' element. A secondary content viewport Relationship Description (AdVRD) scheme may specify the corresponding secondary content viewport spatial coordinate relationships. For example, the SupplementalProperty descriptor with @schemeIdUri equal to "ur:mpeg:dash:adviewport:2d:2016" may be used to provide AdVRD associated with the containing 'AdaptationSet', 'Representation' or 'SubRepresentation' element. The @ value of the SupplementalProperty element using the AdVRD scheme may include a comma separated list of values for secondary content viewport description parameters. An 'AdaptationSet', 'Representation' or 'SubRepresentation' element may contain one or more AdVRDs to represent one or more ad viewports. The properties of a secondary content viewport can be described by the AdVRD parameters as shown in Table 23.

TABLE 23

Example secondary content viewport Relationship Description (AdVRD) Scheme.

| AdVRD scheme | Description |
| --- | --- |
| @schemeIdUri | urn:mpeg:dash:adviewport:2d:2016 |
| @value | Comma-separated list of values for the following fields: viewport_id, viewport_x, viewport_y, viewport_width, viewport_height, full_width and full_height |
| viewport_id | Non-negative integer in decimal representation providing a unique identifier for secondary content viewport |
| viewport_x | non-negative integer in decimal representation expressing the horizontal position of the top-left corner of identified viewport |
| viewport_y | non-negative integer in decimal representation expressing the vertical position of the top-left corner of the identified viewport |
| viewport_width | non-negative integer in decimal representation expressing the width of identified viewport |
| viewport_height | non-negative integer in decimal representation expressing the height of identified viewport |
| full_width | non-negative integer in decimal representation expressing the width of entire 360 degree video. If not present, the value may be inferred to be the same as the value of viewport width. |
| full_height | non-negative integer in decimal representation expressing the height of entire 360 degree video. If not present, the value may be inferred to be the same as the value of viewport height. |

The coordinates specified in the AdVRD may be consistent with the video type, projection method and layout used for the 360 video in the containing 'AdaptationSet', 'Representation' or 'SubRepresentation' element. As an example, a simplified MPD having one period with one secondary content viewport is shown in Table 24.

TABLE 24

Simplified exmaple MPD with one secondary content viewport defined over an entire period.

```
<MPD>
  <!-- Period with a secondary content viewportsignalled using AdVRD -->
  <Period id="Main_content">
    <!-- 360 degree video with equirectangular with a secondary content viewport-->
    <AdaptationSet mimeType="video/mp4" ... videoType=2>
      <!-- Keep statistics of user's head orientation over duration of this period -->
      <InbandEventStream schemeIdUri="urn:mpeg:dash:orientationstatskeep:2016" />
      <!-- Definition of secondary content viewport -->
      <SupplementalProperty schemeIdUri="urn:mpeg:dash:adviewport:2d:2016"
        value="1,1000,400,640,480,4096,2048"/>
      <Representation @id="0" width="4096" height="2048" bandwidth="327597">
        <BaseURL>main_content.mp4</BaseURL>
      </Representation>
    </AdaptationSet>
  </Period>
</MPD>
```

Figure 11:
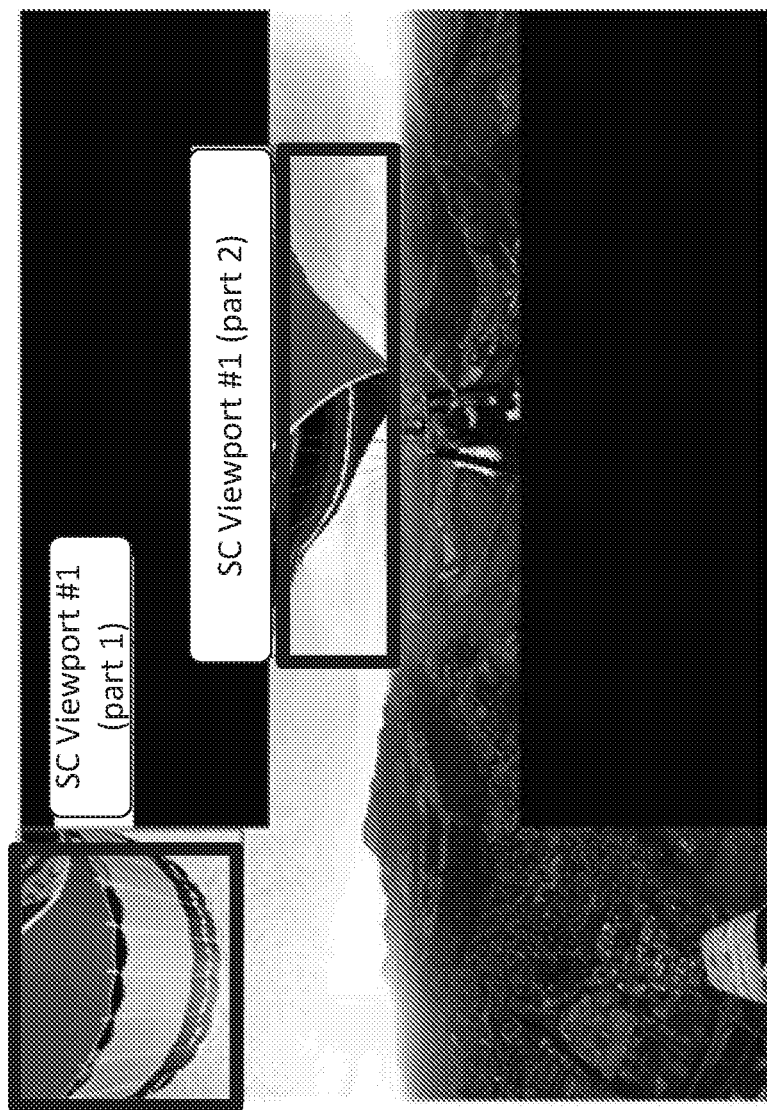
FIG. 11 depicts an example viewport defined over several regions of a cubemap projection.

FIG. 11 depicts an example viewport defined over several regions of a cubemap projection. If the '@videoType', '@projection' and a '@layout' combination result in a secondary content viewport laid out over several regions of the 2D projected video, multiple AdVRDs may be defined to indicate the portions of the viewport in different regions, as shown in FIG. 11. The client may consolidate the statistics for the parts of the viewport prior to reporting orientation statistics to the server.

A secondary content viewport may be associated with part of a 'Period.' Secondary content viewports specified over part of a period may be signaled to streaming clients using a 'SupplementalProperty' element and/or the secondary content viewport Relationship Description (AdVRD) scheme in Table 23. A single period of, for example, a TV show, may be composed of several scenes. Secondary content viewports may be defined over all of the scenes or some of these scenes.

As an example, a simplified MPD having one period with one secondary content viewport defined over part of a period is shown in Table 25. In the 'Event' element, 'presentationTime' may indicate the start time of the ad viewport, and 'duration' may indicate its duration. To obtain the time in seconds, 'presentationTime' and 'duration' may be divided by the value of 'timescale' from the 'InbandEventStream' element.

TABLE 25

Simplified example MPD with a secondary content viewport defined over part of a period

```
<MPD>
  <!-- Period with a secondary content viewportsignalled using AdVRD -->
  <Period id="Main_content">
    <!-- 360 degree video with equirectangular with a secondary content viewport-->
    <AdaptationSet mimeType="video/mp4" ... videoType=2>
      <!-- Start keeping statistics user's head orientation 20 seconds after
           beginning of Period. Keep statistics over 10 seconds for secondary content viewport
"1". -->
      <InbandEventStream schemeIdUri="urn:mpeg:dash:orientationstatskeep:2016"
timescale="1000">
        <Event presentationTime="20000" duration="10000" id="1" />
      </InbandEventStream>
      <!-- Definition of secondary content viewport -->
      <SupplementalProperty schemeIdUri="urn:mpeg:dash:adviewport:2d:2016"
        value="1,1000,400,640,480,4096,2048"/>
      <Representation @id="0" width="4096" height="2048" bandwidth="327597">
        <BaseURL>main_content.mp4</BaseURL>
      </Representation>
    </AdaptationSet>
  </Period>
</MPD>
```

A secondary content viewport may be associated with an entire streaming session. Secondary content viewports specified over an entire streaming session may be signaled to streaming clients using a 'SupplementalProperty' element and the secondary content viewport Relationship Description (AdVRD) scheme in Table 23. For example, a 'SupplementalProperty' element as defined in Table 25 at the MPD level may indicate secondary content viewports of interest. As an example, a simplified example MPD having one secondary content viewport defined over the entire streaming session is shown in Table 26.

TABLE 26

Simplified example MPD with one secondary content viewport defined over an entire streaming session

```
<MPD>
  <!-- Keep statistics of user's head orientation over duration of streaming session -->
  <InbandEventStream schemeIdUri="urn:mpeg:dash:orientationstatskeep:2016" />
  <!-- Definition of secondary content viewport -->
  <SupplementalProperty schemeIdUri="urn:mpeg:dash:adviewport:2d:2016"
    value="1,1000,400,640,480,4096,2048"/>
  <Period> ... </Period>
  ...
  <Period> ... </Period>
</MPD>
```

Orientation statistics over an entire streaming session may be used to identify the most viewed areas of a 360 degree video. The client may gather data on a set of specified ad viewports, using the scheme shown as an example in Table 26.

Figure 12:
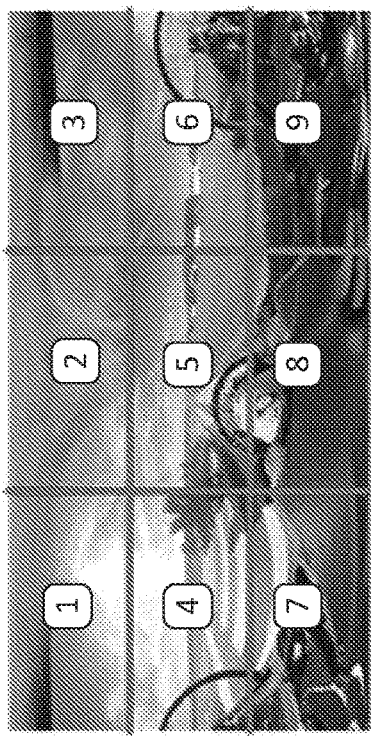
FIG. 12 depicts an exemplary 360 degree video frame partitioned in a 3×3 grid for gathering orientation statistics.

Statistics of areas of the 360 degree video may be kept. FIG. 12 depicts an example 360 degree video frame partitioned in a 3×3 grid for gathering orientation statistics. The client may gather orientation statistics over the areas of the 360 degree video. The client may partition the 360 degree video frame into a grid (for example, 3×3 grid in FIG. 12) and may report orientation statistics over one or more of these areas at the end of the streaming session.

The grid size may be signaled to the client. For example, the 'InbandEventStream' element with @ schemeIdUri equal to "urn:mpeg:dash:orientationstatskeep:2016" at the MPD level, may be used to indicate the grid size, as shown in Table 27. The grid areas may be numbered in raster scan order from left to right and top to bottom, although other numbering orders may be used. The orientation statistics report may be sent to a server by the client. As an example, a simplified MPD for keeping orientations statistics over the entire streaming session on the entire 360 degree video partitioned on a 3×3 grid is shown in Table 28.

TABLE 27

'Orientation stats keep' scheme indicating grid size for keeping statistics over some areas of the 360 degree video.

| Element or Attribute Name | Description |
| --- | --- |
| InbandEventStream | |
| @schemeIdUri | urn:mpeg:dash:orientationstatskeep:2016 |
| @value | May specify the grid size (M × N) used to keep statistics over areas of the 360 degree video. |

TABLE 28

Simplified example MPD for keeping orientation statistics over the areas of a 360 degree video with a 3 × 3 grid

```
<MPD>
<!-- Keep statistics of user's head orientation over
duration of streaming session -->
<InbandEventStream schemeIdUri="urn:mpeg:
dash:orientationstatskeep:2016"
value="3×3"/>
<Period> ... </Period>
...
<Period> ... </Period>
</MPD>
```

Statistics of some areas of the 360 degree video may be kept. The client may gather orientation statistics over some areas of the 360 degree video. The client may partition the 360 degree video frame into a grid (for example, 3×3 grid in FIG. 12) and may report orientation statistics over a subset of these areas at the end of the streaming session.

The grid size may be signaled to the client. For example, the 'InbandEventStream' element with @schemeIdUri equal to "urn:mpeg:dash:orientationstatskeep:2016" at the MPD level, may be used to indicate the grid size, as shown in Table 29. An attribute @ areas may indicate a list of area numbers over which statistics are kept, as shown in Table 29. The grid areas may be numbered in raster scan order from left to right and top to bottom, although other numbering orders may be used. The orientation statistics report may be sent to a server by the client. As an example, a simplified MPD for keeping orientations statistics over the entire streaming session on areas 4, 5 and 6 of a 360 degree video partitioned on a 3×3 grid is shown in Table 30.

TABLE 29

'Orientation stats keep' scheme indicating grid size for keeping statistics over some areas of the 360 degree video.

| Element or Attribute Name | Description |
| --- | --- |
| InbandEventStream | |
| @schemeIdUri | urn:mpeg:dash:orientationstatskeep:2016 |
| @value | May specify the grid size (M × N) used to keep statistics over some areas of the 360 degree video. |
| @areas | May specify the list of areas over which statistics are kept. List of areas (identified by numbers between 1 and M × N) is comma-separated. Invalid area numbers may be ignored. |

TABLE 30

Simplified example MPD with for keeping orientation statistics over an entire streaming session with a 3 × 3 grid.

```
<MPD>
< !-- Keep statistics of user's head orientation over duration
of streaming session -->
<InbandEventStream
schemeIdUri="urn:mpeg:dash:orientationstatskeep:2016"
value="3×3"
     areas="4, 5, 6" />
<Period> ... </Period>
...
<Period> ... </Period>
</MPD>
```

While the description of this section assumes that position of secondary content viewports is static, the concepts described herein also apply if the streaming system supports a method for identifying and tracking moving objects in 360 degree video. For example, if a moving car is shown in a scene, this moving object may be defined as a secondary content viewport and may be signaled to the client as such.

A streaming client may determine which ad to show based on a list of ads in the MPD and the relation between the ads and ad viewports. The list of secondary contents may be specified within a single period. A secondary content in the list may be associated with a secondary content viewpoint. The relation between secondary contents and their respective secondary content viewports may be established via secondary content viewport ids.

Secondary content(s) may be selected based on the tracked secondary content viewport parameter and/or the relation between secondary contents and their respective secondary content viewports. For example, the 'EssentialProperty' descriptor with @schemeIdUri equal to "urn:mpeg:dash:adselection:2016" may specify the relation between the secondary content viewport and the secondary content in the containing 'AdaptationSet' 'Representation' or 'SubRepresentation' element. In a list of secondary contents, the 'EssentialProperty' descriptor may use the same @id, indicating that the processing of one of the descriptors with an identical value may be sufficient. For example, a secondary content may be selected from the list. The relation to secondary content viewports may be established by setting the @value to the secondary content viewport id of the corresponding secondary content viewport. For the 'secondary content selection' scheme, the attributes are listed in Table 31.

TABLE 31

Example semantics of the elements and attributes of the 'secondary content selection' scheme

| Element or Attribute Name | Description |
|---|---|
| EssentialProperty | |
| @schemeIdUri | urn:mpeg:dash:adselection:2016 |
| @id | May specify an identifier for the descriptor. Identical values for this attribute may be used for secondary contents in the same list, indicating that the selection of one of the descriptors with an identical value may be sufficient. |
| @value | Corresponds to the @viewport_id attribute of the secondary content viewport that corresponds to this descriptor. The special value '9999' may be reserved for the default ad, that is, the ad that may be used if none of the other ads are selected. |

Whether to provide ad periods with secondary content viewport information to a client may be conditioned on the client's capabilities. For example, ad periods with secondary content viewport information may be given to streaming clients that support secondary content viewports. If the scheme of the 'EssentialProperty' descriptor is not recognized by the DASH client, the client may not receive ad periods with secondary content viewport information.

As an example, a simplified MPD having one period with two ad viewports, followed by a period with a list of ads that correspond to these ad viewports, is shown in Table 32. If multiple secondary content viewports are defined, the same ad may be shown for multiple viewports. A default ad may be listed, for example, in case the user's head orientation does not fall within any of the ad viewports.

TABLE 32

Simplified example MPD showing ad selection based on ad viewports.

```
<MPD>
 <!- Main content period with secondary content viewports signalled using AdVRD -->
 <Period id="Main_content">
  <!-- 360 degree video with equirectangular with two secondary content viewports -->
  <"AdaptationSet mimeType="video/mp4" ... videoType=2>
   <!-- Keep statistics of user's head orientation over duration of this period -->
   <InbandEventStream schemeIdUri="urn:mpeg:dash:orientationstatskeep:2016" />
   <!-- Definition of secondary content viewport with id=1 -->
   <SupplementalProperty schemeIdUri="urn:mpeg:dash:adviewport:2d:2016"
    value="1,1000,400,640,480,4096,2048"/>
   <!-- Definition of secondary content viewport with id=2 -->
   <SupplementalProperty schemeIdUri="urn:mpeg:dash:adviewport:2d:2016"
    value = "2,500,800,640,480,4096,2048"/>
   <Representation @id="0" width="4096" height="2048" bandwidth="327597">
    <BaseURL>main_content.mp4</BaseURL>
   </Representation>
  </AdaptationSet>
 </Period>
 <!-- Ad period with list of ads from which one is selected based on secondary content
viewport -->
 <Period id="Ad_period">
  <!-- List of ads -->
  <AdaptationSet mimeType="video/mp4" ... videoType=2>
   <!-- Show this ad if user attention was on viewport with id=1 (set value=1) -->
   <EssentialProperty schemeIdUri="urn:mpeg:dash:adselection:2016" id="Ad_1"
value="1"/>
    <Representation @id="0" width="4096" height="2048" bandwidth="327597">
     <BaseURL>ad_related_to_viewport_1.mp4</BaseURL>
    </Representation>
   </AdaptationSet>
   <AdaptationSet mimeType="video/mp4" ... videoType=2>
    <!-- Show this ad if user attention was on viewport with id=2 (set value=2) -->
    <EssentialProperty schemeIdUri="urn:mpeg:dash:adselection:2016" id="Ad_2"
value="2"/>
    <Representation @id="0" width="4096" height="2048" bandwidth="327597">
     <BaseURL>ad_related_to_viewport_2.mp4</BaseURL>
    </Representation>
   </AdaptationSet>
   <AdaptationSet mimeType="video/mp4" ... videoType=2>
    <!-- This is default ad if user attention was not on any viewport (set value=9999)-->
    <EssentialProperty schemeIdUri="urn:mpeg:dash:adselection:2016" id="Ad_default"
value="9999"/>
    <Representation @id="0" width="4096" height="2048" bandwidth="327597">
     <BaseURL>default_ad.mp4</BaseURL>
    </Representation>
   </AdaptationSet>
  </Period>
</MPD>
```

The list of secondary content viewports may be different per user, and may vary between views of the same content by the same user. For example, multiple ads may be shown by using multiple ad periods, each with corresponding secondary content viewport information.

An indication that reporting orientation statistics is desired may be sent to streaming clients using an InbandEventStream element. The 'orientation stats report' scheme shown in Table 33 may be used to specify this signal.

TABLE 33

'Orientation stats report' scheme for 'InbandEventStream'

| Element or Attribute Name | Description |
|---|---|
| InbandEventStream | |
| @schemeIdUri | urn:mpeg:dash:orientationstatsreport:2016 |
| @reportServer:href | URL of server where statistics may be reported. |

The signal to indicate that reporting orientation statistics is desired may follow the signal to start keeping statistics within a 'Period' (or part of a 'Period') or over the entire streaming session, as described herein.

A simplified example MPD using 'InbandEventStream' to indicate that reporting statistics gathered over a 'Period' is desired is shown in Table 34.

TABLE 34

Simplified example MPD signaling 'orientation stats report' over a 'Period'

```
<MPD>
 <Period>>
  <AdaptationSet>
   <!-- Keep statistics of user's head orientation over duration of this period -->
   <InbandEventStream schemeIdUri="urn:mpeg:dash:orientationstatskeep:2016" />
   <!-- Report orientation statistics gathered over duration of this period -->
   <InbandEventStream schemeIdUri="urn:mpeg:dash:orientationstatsreport:2016"
reportServer="http://report.server.com/" />
   ...
  </AdaptationSet>
 ...
 </Period>
</MPD>
```

A simplified example MPD using 'InbandEventStream' to indicate that reporting statistics gathered over a streaming session is desired is shown in Table 35.

TABLE 35

Simplified example MPD signaling 'orientation stats report' over a streaming session

```
<MPD>
 <!-- Keep statistics of user's head orientation over duration of this session -->
 <InbandEventStream schemeIdUri="urn:mpeg:dash:orientationstatskeep:2016" />
 <!-- Report orientation statistics at the end of this session -->
 <InbandEventStream schemeIdUri="urn:mpeg:dash:orientationstatsreport:2016"
reportServer="https://report.server.com/" />
 <Period> ... < /Period>
 ...
 <Period> ... < /Period>
</MPD>
```

The timing for reporting statistics may be pre-determined or dynamically signaled. For example, reporting may take place at the end of the containing Period element, may take place at the end of the streaming session, and/or the streaming client may save multiple report for batch uploading (e.g., nightly, weekly).

Upon determining which secondary content has been selected based on secondary content viewport information, the secondary content may be fetched from the content server and presented to the viewer. A 360 degree secondary content may be presented in a 360 degree environment. 3D and/or rectilinear (2D) secondary contents may be presented for 360 degree video content.

For example, a 2D secondary content may be presented as a 2D video within the 360 degree video environment. For example, HMDs for 360 degree video may provide support for displaying content having multiple layers. For example, a layer may be the 360 degree video content and another layer may be a head-up display (HUD) layer with information about the content being shown, a navigation menu, or a 2D secondary content. The 2D secondary content may be placed in a fixed position within the 360 degree video content such that the 2D secondary content may move in response to changes in user orientation. The 2D secondary content may be placed in a fixed position relative to the user's orientation (e.g. "headlocked"), such that changes in user orientation may not move the 2D secondary content, and such content maybe rooted in the same position within the user's view. In some embodiments, the 2D secondary content may blend into the other content in the 360 degree video. For example, an ad for a car may add the image of the car into the 360 video in a place where a car might naturally park within the scene. This effect may be realized by jointly designing the main 360 video content and the ad content. Specific secondary content insertion locations in which specific ads are designed to blend in may be received via signaling.

The 2D secondary content may be shown in the user's view. It may cover the viewport shown to the user. It may be scaled to appear smaller or larger within the viewport. The 2D secondary content may be placed in different positions within the viewport. For example, the 2D secondary content may be placed at the top, bottom, left, and/or right of the viewport. The 2D secondary content may be placed outside of the current viewport, such that the user may not be startled or may not have a realistic experience interrupted by new content suddenly appearing in the field of view. In this case, the 2D secondary content may be placed in a direction that the user is likely to look in the near future. Visual or audio hints may be used to prompt the user to look in the direction where the 2D secondary content (e.g. an ad) is placed.

Figure 13:
FIG. 13 shows an example screenshot of a 360 degree video with a 2D ad shown in a head-up display (HUD) layer.

FIG. 13 shows an example screenshot of a 360 degree video with an ad. As can be seen, the secondary content may be placed in the user's view, but it does not cover the entire viewport.

Secondary content insertion location may be received. DASH signaling may be used to indicate to the streaming client information about secondary content insertion location (e.g., where the secondary content may be inserted). For example, the size and position of a 2D ad within a 360 degree environment may be signaled to the streaming client. The SupplementalProperty descriptor with @ schemeIdUri equal to "urn:mpeg:dash:adposition:2d:2016" may indicate 2D ad information associated with the containing 'AdaptationSet', 'Representation' or 'SubRepresentation' element.

The @value of the SupplementalProperty element using the ad position scheme may include a comma separated list of values for secondary content insertion position parameters. An 'AdaptationSet', 'Representation' or 'SubRepresentation' element may contain none or a secondary content position parameter for an ad period. Example properties of an ad position can be described by the parameters shown in Table 36.

TABLE 36

Secondary content position scheme

| Secondary content position scheme | Description |
| --- | --- |
| @schemeIdUri | urn:mpeg:dash:adposition:2d:2016 |
| @value | Comma-separated list of values for the following fields: position id, scale, position and position y |
| position_id | Non-negative integer in decimal representation providing a unique identifier for secondary content insertion position |

TABLE 36-continued

Secondary content position scheme

| Secondary content position scheme | Description |
| --- | --- |
| position_x | non-negative integer in decimal representation expressing the horizontal position of the top-left corner of secondary content within the 360 degree environment. |
| position_y | non-negative integer in decimal representation expressing the vertical position of the top-left corner of secondary content within the 360 degree environment. |
| notify | Boolean ('true', 'false') expressing whether attention of the user is called if the secondary content does not appear in the viewport being shown to the user. Default value may be 'true'. |

For example, the "notify" parameter may include a Boolean true/false expressing whether notification should be presented to the user in case the secondary content is displayed outside of the user's current view. For example, if the value is set to true, the user may be alerted in some way (e.g. a sound may be played or a graphical hint may be displayed to alert the user that new content has appeared, or a directional indicator may be displayed to point the user towards the out-of-view secondary content).

In an example, the secondary content is to be presented to the viewer regardless of where the viewer is looking at that time. An indication, such as parameter "notify" shown in Table 36, may indicate that the secondary content is to be presented to the viewer regardless of where the viewer is looking at that time. For example, if the "notify" parameter in Table 36 is set to "true" the streaming client may ignore the values 'position_x' and 'position_y' and show the secondary content in the viewport that the user is currently looking at (e.g., the current viewport).

The coordinates specified in the secondary content position scheme may be consistent with the video type, projection method and layout used for the 360 video in the containing 'AdaptationSet'. Representation or 'SubRepresentation' element.

As an example, a simplified example MPD having an ad period with ad position information is shown in Table 37. In this example, the 2D ad is placed at the (920,640) position within the 360 degree environment. The user may not be notified of the ad, if the ad is shown outside of the viewport being shown to the user. In this case, the 360 degree video may be paused, and the ad may be shown outside of the view of the user. The audio of the secondary content may play, prompting the user to look around in the 360 degree environment and see the secondary content.

TABLE 37

Simplified example MPD of one ad period with ad position information

```
<MPD>
  <!-- Ad period with list of ads from which one is selected based on secondary content viewport -->
  <Period id="Ad _period">
    <!-- List of ads -->
    <AdaptationSet mimeType="video/mp4" ... videoType=2>
      <!-- Show this ad if user attention was on viewport with id=1 (set value=1) -->
      <EssentialProperty schemeIdUri="urn:mpeg:dash:adselection:2016" id="Ad_1" value="1"/>
      <SupplementalProperty schemeIdUri="urn:mpeg:dash:adposition:2d:2016" value="1,920,640,50,false"/>
```

TABLE 37-continued

Simplified example MPD of one ad period with ad position information

```
    <Representation @id="0" width="4096" height="2048" bandwidth="327597">
      <BaseURL>ad_related_to_viewport_1.mp4</BaseURL>
    </Representation>
   </AdaptationSet>
  </Period>
</MPD>
```

Figure 14:
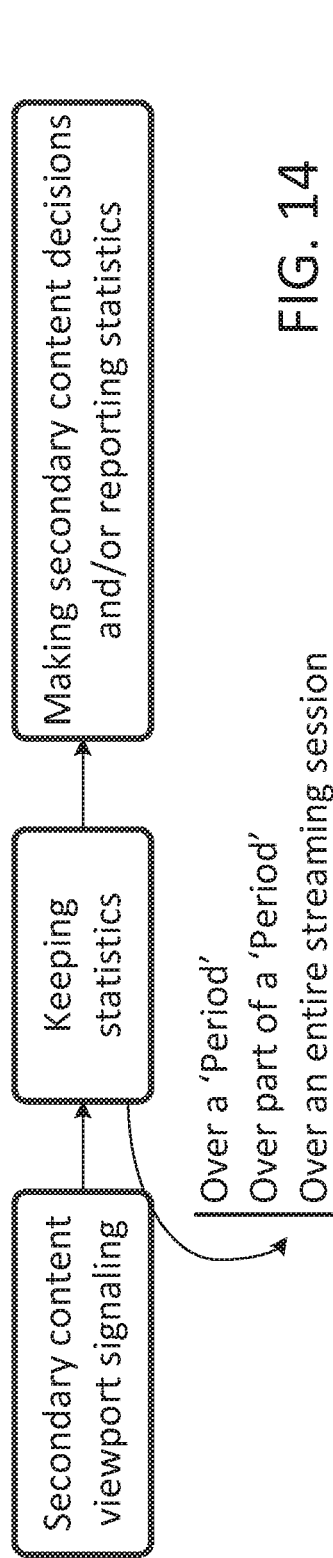
FIG. 14 shows an example streaming client keeping orientation statistics, enabling system to make decisions using secondary content viewports.

A streaming client may keep statistics about users' interest on secondary content viewports during a DASH video streaming session. FIG. 14 shows an example streaming client keeping orientation statistics, enabling system to make decisions using secondary content viewports. As shown, statistics may be kept over a Period, over part of a Period and/or over a streaming session.

The viewport shown to the user may be determined based on head orientation information. Statistics about orientation may be tracked during a streaming session, and computed to support ad viewports. The regions within the 360 degree video frame that the user is watching may be captured. Orientation at a particular instant in time may be used to determine whether the secondary content viewport is shown (e.g., whether the viewer is paying attention to the secondary content viewport). Statistics about user interest in secondary content viewports may be tracked for secondary content viewports and/or for areas of a 360 degree video. Timing of a decoded frame may be used to determine whether it falls within the time interval over which the secondary content viewport is defined Whether the user's head orientation at a given point in time falls within a secondary content viewport may be determined.

Figure 15:
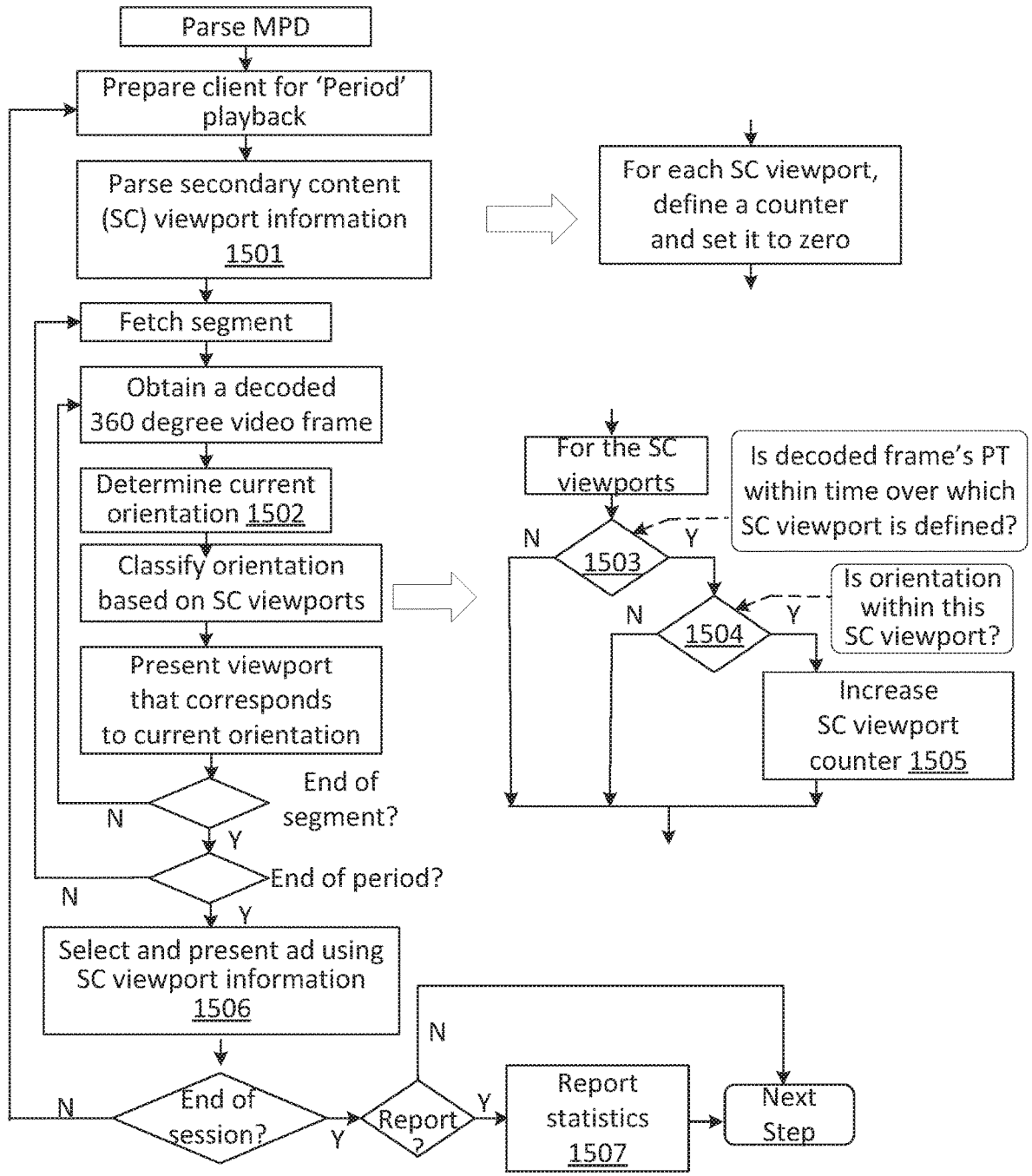
FIG. 15 shows an example of keeping statistics of orientation for use with secondary content viewports.

One or more secondary content viewport parameters may be tracked. Secondary content viewport parameters may include secondary content viewport statistics. FIG. 15 shows an example of keeping statistics of orientation for use with ad viewports. At 1501, secondary content viewport information may be obtained upon parsing information (e.g. a 'Period') in the MPD. Secondary content viewport statistics may be kept using simple counters, with one counter per ad viewport Counters may be associated to a viewport using the 'viewport_id' listed in the MPD, and may be set to zero at the beginning of the algorithm. At 1502, when new orientation information is obtained, it may be compared against the secondary content viewports listed for the corresponding period in the MPD. Some secondary content viewports may be defined for part of a period. The client may determine whether a secondary content viewport is "active". For secondary content viewports that are defined over part of a 'Period', the presentation timestamp of the decoded frame may be within the time over which the secondary content viewport is defined, as specified by the 'InbandEventStream' element. For example, at 1503, the presentation time (PT) of the decoded video frame may be compared against the time interval over which the secondary content viewport is defined. If the secondary content viewport is defined over the entire 'Period', this comparison may be skipped. At 1504, if the current orientation falls within one of the viewports, the corresponding counter may be increased accordingly (e.g., by one) at 1505. Otherwise, the counter may not be increased. The counter may track (e.g. approximately) the amount of time that a user has viewed a particular secondary content viewport. The largest counter may indicate the secondary content viewport that has been seen by the user the most. This result may be used to select a secondary content, at 1506. For example, the ad selection decision may be made by the client and/or by an ad decision server. At 1507, orientation statistics may be reported by the client upon completion of the streaming session.

Figure 16:
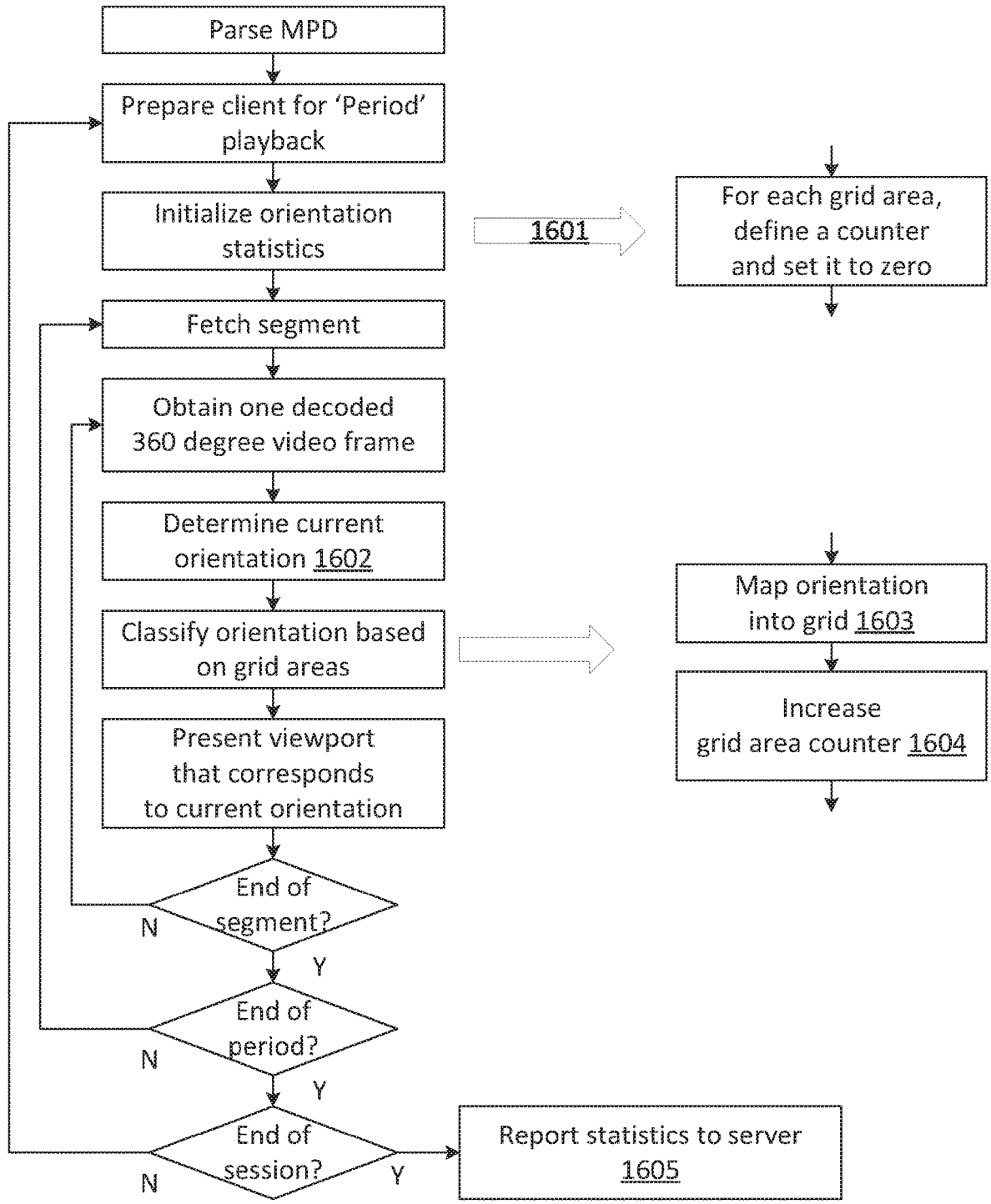
FIG. 16 shows an example of keeping statistics of orientation over areas of a 360 degree video.

FIG. 16 shows an example of keeping statistics of orientation over areas of a 360 degree video. Certain processes may be similar to those described in FIG. 15. Grid area size may be obtained from the MPD (e.g., as indicated by the 'InbandEventStream' element at the MPD level). At 1601, a counter may be defined for each grid area. A different set of counters may be used for each period. A set of counters may be identified by the period's '@id' attribute. At 1602, the orientation information may be obtained, and a grid area corresponding to the orientation information may be mapped or determined at 1603. For example, the grid area which best aligns with the center of the user's view may be selected at 1603, and its corresponding counter may be increased accordingly (e.g., by one) at 1604. At the end of the streaming session, statistics information (e.g., one counter per grid area) may be reported (e.g., to a server) at 1605. Although not shown in FIG. 16, additional steps that utilize the statistics information (e.g. at the client and/or at an ad decision server) to select secondary content (e.g. an ad) and to display such content to the user may be performed (see for example 1506 of FIG. 15).

Video timing information may be matched to a secondary content viewport definition. The presentation time of a decoded frame may be matched to the definition of the secondary content viewport in the MPD. The matching may be performed for secondary content viewports that are defined over part of a 'Period', as secondary content viewports are not "active" for frames in a 'Period'. If a secondary content viewport is defined over a complete 'Period', the streaming client may determine that the frames that belong to the 'Period' are "active".

In a DASH streaming system, the video decoder module may receive as input the bitstream that is contained in downloaded segments, and may provide as output decoded frames in the order to be displayed. The decoder may perform video frame reordering as part of inter-frame prediction. During decoding of MP4 file segments, the presentation time (PT) of a decoded frame may be derived from the frame rate of the video and from the frame number, assuming that the time at the beginning of the 'Period' is zero. For example, the PT of the 120th frame of a video at 30 frames per second is: 120×(1/30)=: 4 seconds. Based on the MPD, the streaming clients may determine the time at which the 'Period' starts, the time at which a secondary content viewport becomes active (from the @presentation attribute of the 'Event' element), and for how long the secondary content viewport is active (from the @duration attribute of the 'Event' element). The streaming client can determine whether the secondary content viewport is active for a decoded frame based on the PT of the decoded frame.

Whether current orientation falls within secondary content viewport may be determined. 360 degree video players may provide APIs for obtaining user's head orientation. Applications that support 360 degree video may provide APIs for determining viewport during playback. The orientation information may include spherical coordinates [0, 6], yaw/roll/pitch; [x,y,z], and the like for denoting a point in a sphere where the user is looking at.

Figure 17:
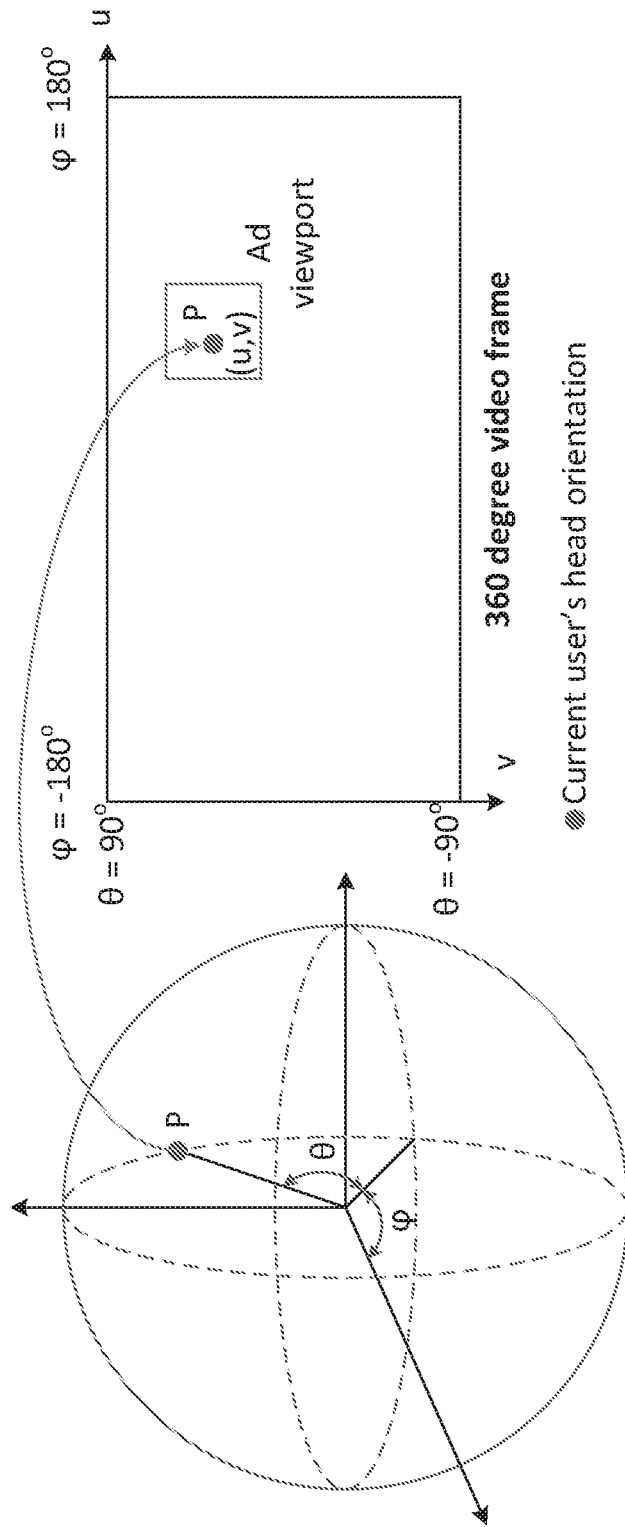
FIG. 17 shows an example of mapping a point in a sphere into a 2D projection of a 360 degree video frame.

As shown in FIG. 15, at 1504, the point in a sphere may be mapped from a point in the sphere into a point in the projection of the 360 degree video frame over which secondary content viewports are defined, as shown in FIG. 17. This mapping may be performed depending on the projection method (e.g., equirectangular, cubemap, pyramid) used in the 360 degree video. For example, if spherical coordinates are used, equations (1) and (2) may be used to map point P with coordinates (0, 6) on a sphere to a point P with coordinate (u, v) on a 2D plane. Whether the point is within a secondary content viewport may be performed, e.g., by comparing the 2D coordinates of the user's head orientation against the 2D coordinates of the secondary content viewport definition.

$$u=\phi/(2*pi)+0.5 \qquad (1)$$

$$v=0.5-0/(pi) \qquad (2)$$

Figure 18:
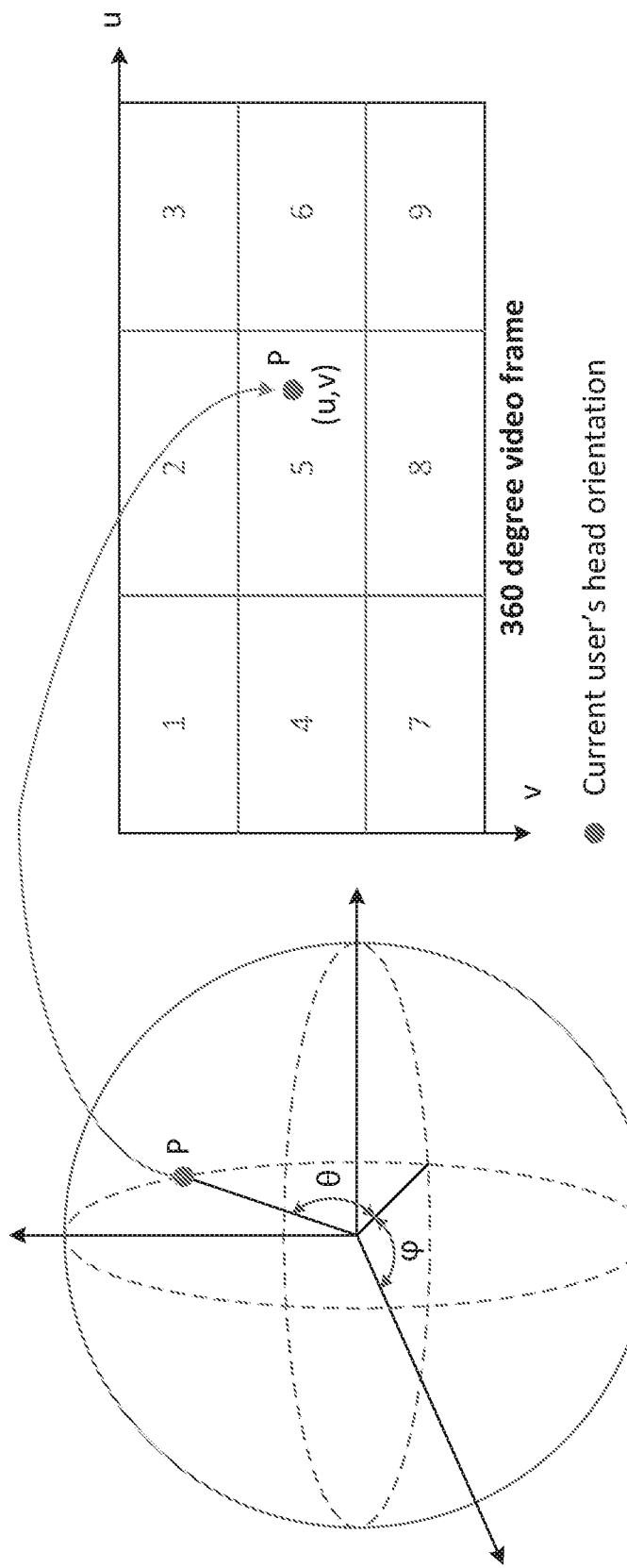
FIG. 18 shows an example of mapping a point in a sphere into 2D projection of 360 degree video frame over which grid is defined.

As shown in FIG. 16, at 1603, the point P in a sphere is mapped into a point in the projection of the 360 degree video frame over which a grid is defined, as shown in FIG. 18. This mapping depends on the projection method (e.g., equirectangular, cubemap, pyramid) used in the 360 degree video. Whether the point is within a grid area may per determined by comparing the 2D coordinates of the user's head orientation against the 2D coordinates of the grids.

Viewing orientation may be classified based on secondary content viewports (e.g., 1503-1505 shown in FIG. 15), and such classification and/or counter input may be performed less than once per frame. For example, classification may be performed twice per second, thus reducing complexity by 15× or more, depending on the frame rate (e.g., frames per second) of the 360 degree video, see Table 38. A computational complexity level may be determined and adjusted based on streaming client's setting and/or capabilities. Determining current orientation may continue as part of ordinary 360 degree video playback.

TABLE 38

Reduction in computational requirements using less frequent secondary content viewport classification.

| Video frame rate | Secondary content viewport classified every frame | Secondary content viewport classified twice per second |
|---|---|---|
| 30 fps | Baseline | 15x reduction |
| 60 fps | Baseline | 30x reduction |

Figure 19:
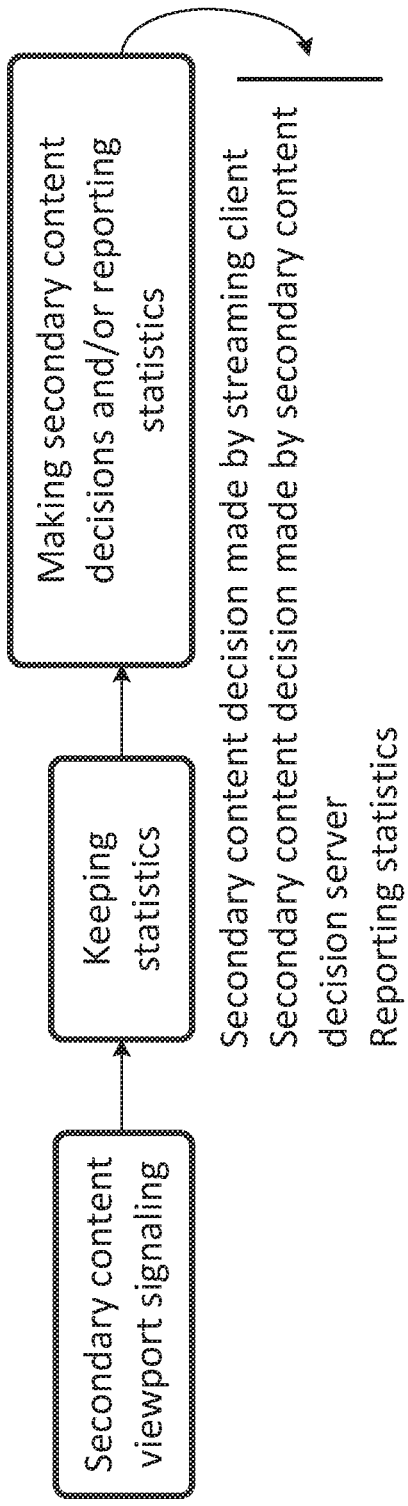
FIG. 19 shows an example of viewing statistics on secondary content viewports that may be used to decide which ad is presented in a streaming session.

Secondary content insertion may be determined based on secondary content viewport parameter. The tracked secondary content viewport parameters information may be reported to a server. FIG. 19 shows an example of viewing statistics on secondary content viewports that may be used to determine which secondary content may be presented in a streaming session.

After the streaming client keeps statistics of user's head orientation over a 'Period', part of a 'Period', or over an entire streaming session, it may determine whether user's attention was on one or more secondary content viewports. This information may be used to select a secondary content(s) relevant to the secondary content viewport(s). The secondary content may be selected by the streaming client and/or by a secondary content decision server. Orientation information may be reported by the streaming client to a server.

Figures 20, 22:
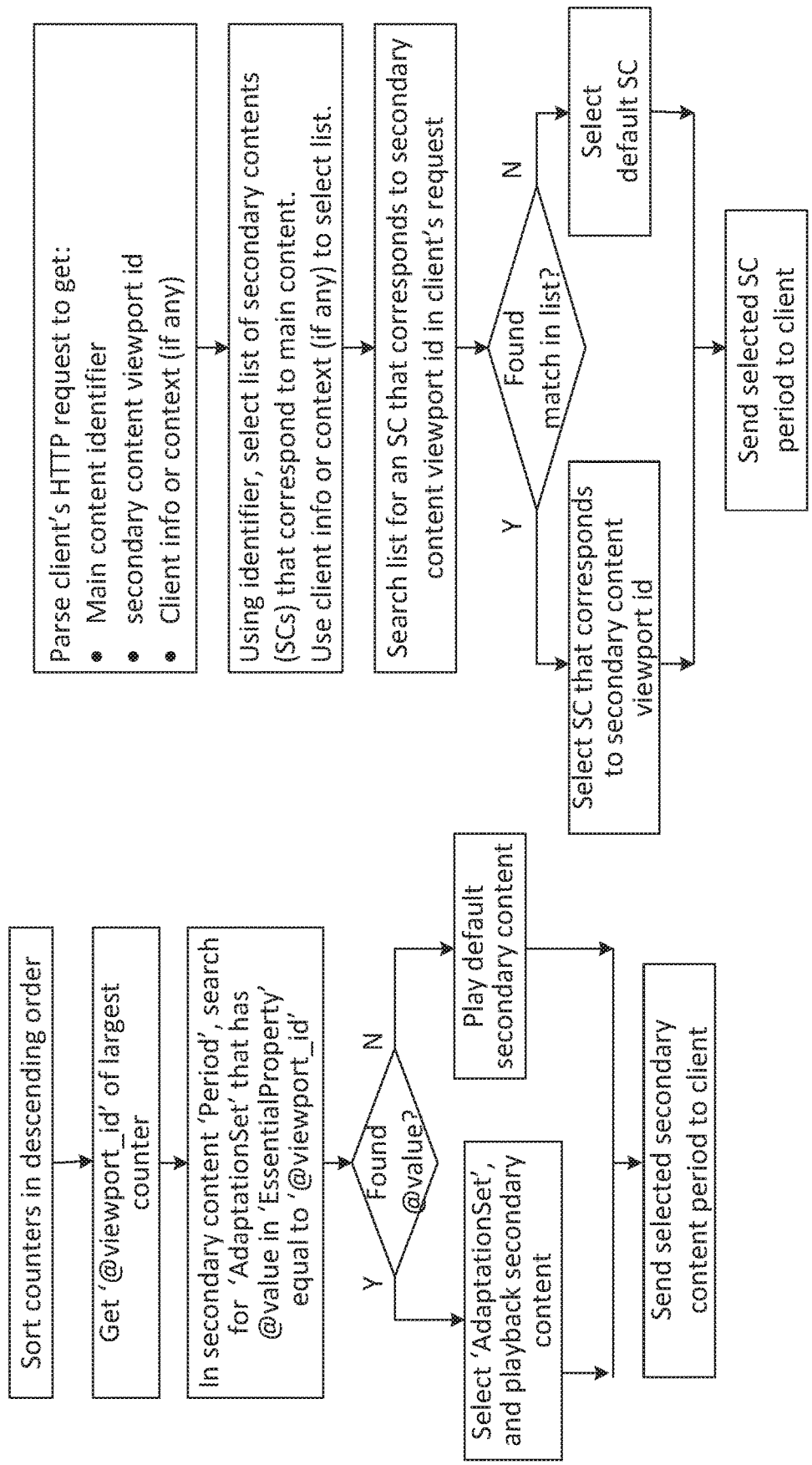
FIG. 20 shows an example of selecting secondary content based on secondary content viewport information.
FIG. 22 shows an example of selecting a secondary content using secondary content viewports.

Secondary content decision may be performed at a streaming client based on secondary content viewport statistics, for example, at 1506 shown in FIG. 15. For example, which ad to show may be determined. Secondary content viewport definitions and a list of possible secondary contents to show based on secondary content viewport information/statistics may be listed in the MPD as shown in Table 32. FIG. 20 shows an example of selecting secondary content based on secondary content viewports.

For example, after a period with secondary content viewport(s) completes playback, the counter(s) that correspond to secondary content viewport(s) may be sorted in descending order. The '@viewport_id' attribute of the secondary content viewport with the largest counter may be identified. For example, in case of a tie, either one of the secondary content viewports may be selected. If the counters are zero, a '@viewport_id' equal to '9999' may be used. In ad 'Period' in MPD, the 'AdaptationSet' that has a ('value' in 'EssentialProperty' (e.g., representing the viewport_id of the ad that corresponds to this descriptor) equal to '@viewport_id' may be searched. If an 'AdaptationSet' is found, then it is selected and the ad may be played back. If no 'AdaptationSet' is found, the default secondary content (@value equal to '9999') may be selected and may be played back. If no default secondary content is listed, then the ad period may be skipped.

Secondary content decision may be performed at a secondary content decision server. For example, information about user's head orientation may be sent to the secondary content decision server. This information may enable the secondary content decision server to determine which secondary content to show. Information may be sent by the client to the secondary content decision server as part of the 'xlink' URL (server-based architecture) or as part of the secondary content MPD URL (app-based architecture).

Content servers may know secondary content viewport information (definition and secondary content viewport id(s)), such that an MPD with this information may be created and provided to clients (content server). Secondary content servers may receive secondary content viewport id(s), and may choose a secondary content based on the secondary content viewport reported by the client.

Remote Periods may be used for ad insertion by using 'xlink' elements with a URL from which an ad period is obtained by the client. For use with secondary content viewports, a query parameter adviewport=x may be appended to the XLink URL used to get the ad period from the ad decision service, where 'x' may represent the id of the secondary content viewport that was more interesting to the user. For example, consider the 360 degree video with two secondary content viewports and a remote period shown in Table 39. If the secondary content viewport with viewport_id=:2 is seen by the user the most, the requesting client may append the query parameter 'adviewport=2' to the XLink URL as shown below: https://adserv.com/avail.mpd?scte35-time=PT600.6S&scte35-cue=DAIAAAAAAAAA AQAAZ_I0VniQAQAgBDVUVJQAAAAH+cAAAA AA%3D %3D &adviewport=2.

For example, the secondary content decision server may select an ad 'Period' by using one or more of: information in the secondary content viewport query (in this example, the query parameter 'adviewport=2'), information about the relation between secondary content viewports and ads, shown in Table 40, or client information passed as additional parameters in the request or included in the request context (e.g., HTTP cookies or device ad identifiers). For example, there may be multiple lists of ad periods (Table 40) for different viewers or devices.

based on the request received from the client containing the secondary content viewport that was seen the most by the user. Using the main content identifier (e.g., SCTE 35 cue message or DASH 'AssetIdentifier'), a list of secondary content may be selected. The selection of the list may be

TABLE 39

Simplified sample MPD of a 360 degree video with secondary content insertion using remote periods.

```
<MPD>
 <!-- Main content period with secondary content viewports signalled using AdVRD -->
 <Period id="Main content">
  <!-- 360 degree video with equirectangular with two secondary content viewports -->
  <AdaptationSet mimeType="video/mp4" ... videoType=2>
   <!-- Keep statistics of user's head orientation over duration of this period -->
   <InbandEventStream schemeIdUri="urn:mpeg:dash:orientationstatskeep:2016" />
   <!-- Definition of secondary content viewport with id=1 -->
   <SupplementalProperty schemeIdUri="urn:mpeg:dash:adviewport:2d:2016"
     value="1,1000,400,640,480,4096,2048"/>
   <!-- Definition of secondary content viewport with id=2 -->
   <SupplementalProperty schemeIdUri="urn:mpeg:dash:adviewport:2d:2016"
     value="2,500,800,640,480,4096,2048"/>
   <Representation @id="0" width="4096" height="2048" bandwidth= "327597">
    <BaseURL>main_content.mp4</BaseURL>
   </Representation>
  </AdaptationSet>
 </Period>
 <!-- Ad is a remote period. Passing base64url-coded SCTE 35 to XLink resolver -->
 <Period duration="PT60.6S" id="ad_break_1"
   xlink:href="https://adserv.com/avail.mpd?scte35-time=PT600.6S&scte35-
cue=DAIAAAAAAAAAAAQAAZ_I0VniQAQAgBDVUVJQAAAAH+cAAAAAA%3D%3
D"
   xlink:actuate="onRequest" >
 </Period>
</MPD>
```

TABLE 40

List of ad periods from which one may be selected by secondary content decision server based on secondary content viewport information

```
<!-- Ad for secondary content viewport with id=1 -->
<Period id="Ad_period">
 <AdaptationSet mimeType="video/mp4" ... videoType=2>
  <!-- Show this ad if user attention was on viewport with id=1 (set value=1) -->
  <Representation @id="0" width="4096" height="2048" bandwidth="327597">
   <BaseURL>ad_related_to_viewport_1.mp4</BaseURL>
  </Representation>
 </AdaptationSet>
</Period>
<!-- Ad for secondary content viewport with id=2 -->
<Period id="Ad_period">
 <AdaptationSet mimeType="video/mp4" ... videoType=2>
  <!-- Show this ad if user attention was on viewport with id=2 (set value=2) -->
  <Representation @id="0" width="4096" height="2048" bandwidth="327597">
   <BaseURL>ad_related_to_viewport_2.mp4</BaseURL>
  </Representation>
 </AdaptationSet>
</Period>
<!-- Ad used if user attention was not on any viewport -->
<Period id="Ad_period">
 <AdaptationSet mimeType="video/mp4" ... videoType=2>
  <!-- This is default ad if user attention was not on any viewport (set value=9999)-->
  <Representation @id="0" width == "4096" height="2048" bandwidth="327597">
   <BaseURL>default_ad.mp4</BaseURL>
  </Representation>
 </AdaptationSet>
</Period>
```

Figure 21:
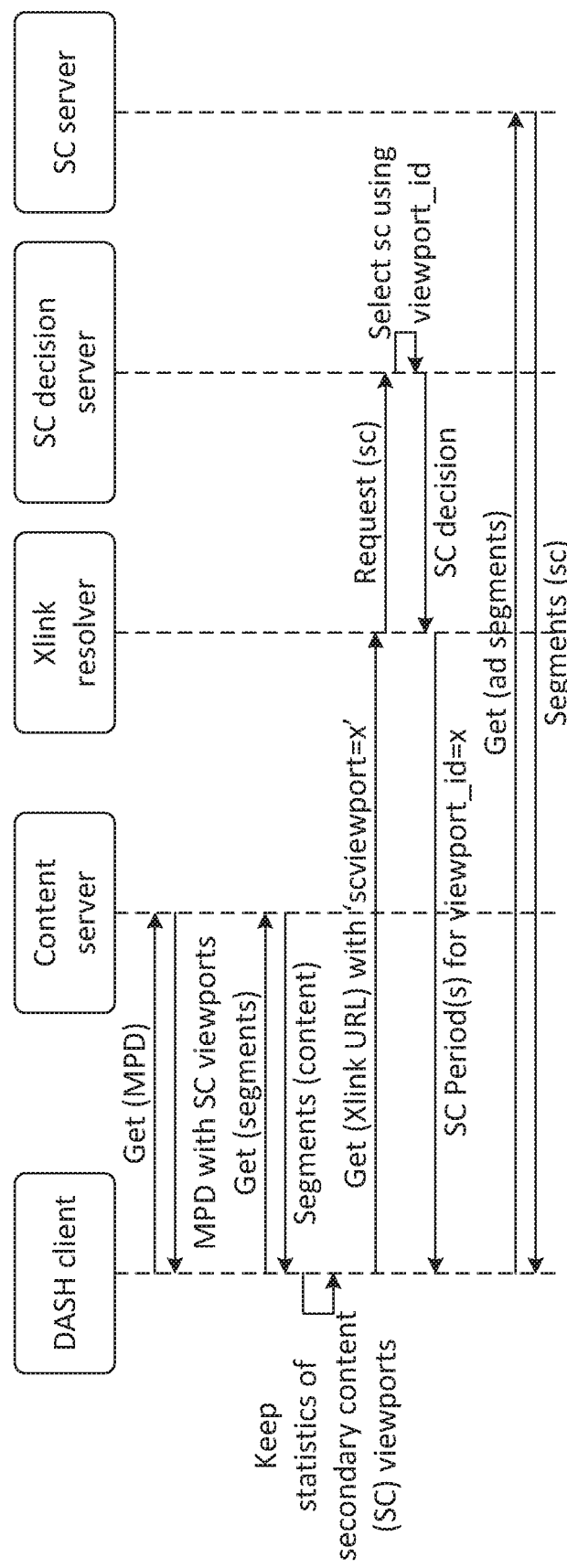
FIG. 21 shows an example call flow of a DASH presentation with secondary content insertion using remote periods and secondary content viewports.

FIG. 21 shows an example call flow of a DASH presentation with secondary content insertion using remote periods and secondary content viewports.

FIG. 22 shows an example of selecting a secondary content using secondary content viewports. The secondary content decision server may select secondary content(s) made using client information passed as parameters in the HTTP request or using request context (e.g. HTTP cookies or device ad identifier). The secondary content decision server may search the list for a matching secondary content viewport. If a match is found, the corresponding secondary content period may be sent back to the client. Otherwise, a default secondary content may be sent to the client or the ad break may be not taken (resulting in a Period with zero length). For simplicity, FIG. 22 shows the selection of a single secondary content. If multiple secondary contents are to be shown, the steps may be executed multiple times, or the list held by the secondary content decision server may have multiple secondary content periods for the same secondary content viewport.

Figures 23, 24:
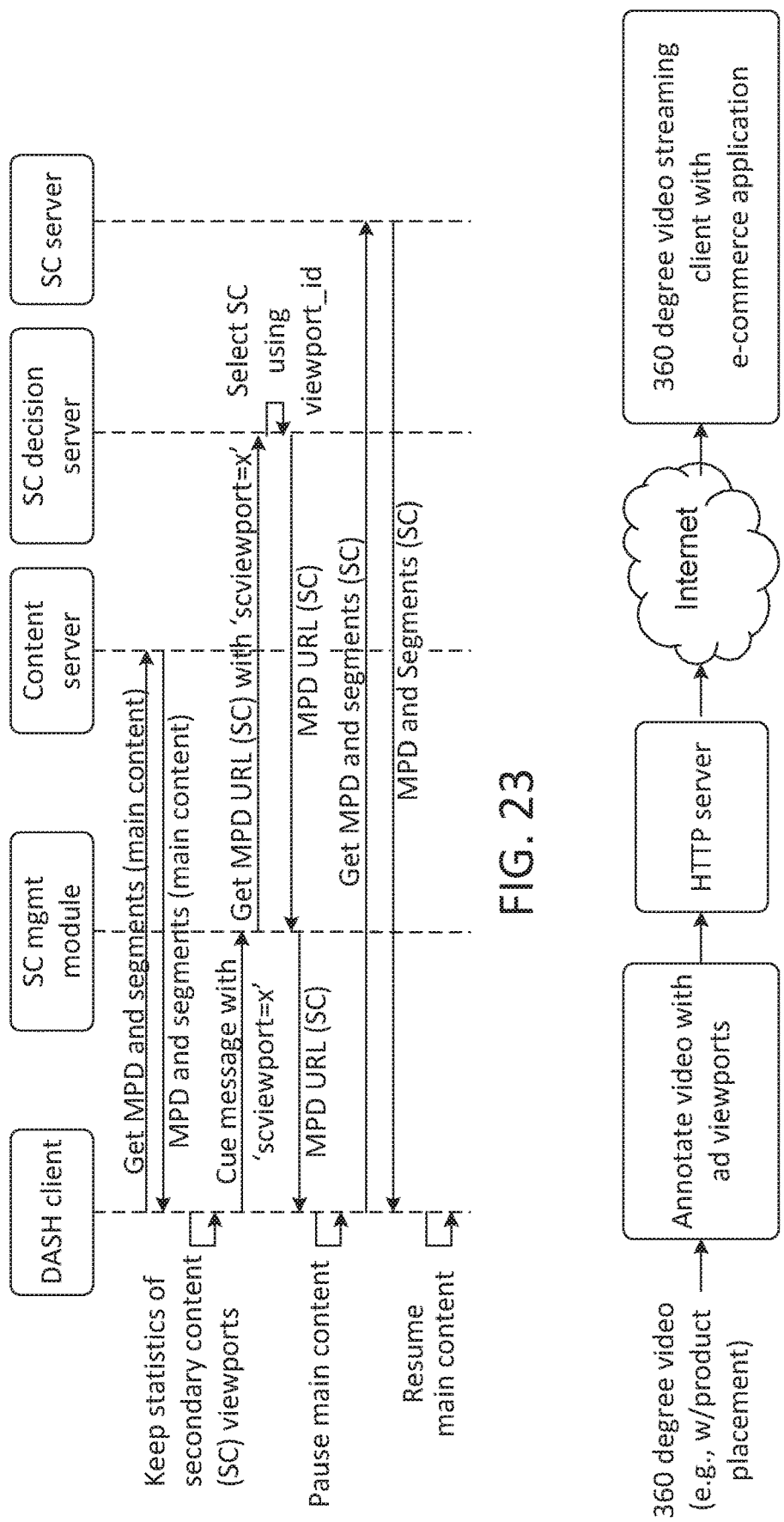
FIG. 23 shows an example call flow of a DASH presentation with app-based secondary content insertion using secondary content viewports.
FIG. 24 is an example block diagram of e-commerce application with secondary content viewports.

For example, an in-client app may obtain an MPD with an ad 'Period' (or periods) from the ad decision server by sending an HTTP request with cue information (which may uniquely identify the main content). A URL may be used to send an HTTP request from the app to the ad decision server. For use with secondary content viewports, a query parameter adviewport=x (or a similar parameter that may identify a secondary content viewport) may be appended to the HTTP request sent to the ad decision server, where 'x' may indicate the id of the secondary content viewport that was most watched by the user. The ad decision server may decide which ad to select based on the secondary content viewport information, for example, as shown in FIG. 22. FIG. 22 shows an example of selecting an ad using secondary content viewports. FIG. 23 shows an example call flow of a DASH presentation with app-based secondary content insertion using secondary content viewports.

A streaming client may report statistics about orientation information to a server, for example, at 1507 as shown in FIG. 15 and at 1605 in FIG. 16. Orientation information may be reported to a server for identifying the secondary content viewports or the areas of 360 degree video that are most watched by users. Orientation statistics may be kept over a set of secondary content viewports or over areas of the 360 degree video.

For reporting statistics for a set of secondary content viewports defined over a period (or part of a period), the client may have one set of counters per period. Statistics for periods for which no secondary content viewports are defined may be empty. The client may report the id of content for which statistics are being reported, the period over which the secondary content viewport is defined, the secondary content viewport identifier, and/or the value of the counter.

For reporting statistics for a set of secondary content viewports defined over an entire streaming session, the client has one set of counters per period, because statistics are kept on a per-period basis (e.g., at 1501 as shown in FIG. 15). The streaming client may report the id of content for which statistics are being reported, the period over which the counter is reported, the secondary content viewport identifier, and/or the value of the counter.

For reporting statistics over areas of a 360 degree video, the streaming client may use a set of counters per period. Statistics may be kept on a per-period basis (e.g., at 1601 of FIG. 16). There may be M N counters, a counter for an area on the grid defined in the MPD. The streaming client may report, for a period, a counter per grid area. The number of periods in the session may be included as a separate element in the report. The streaming client's report may have K×M×N counters for a session with 'K' periods.

The format of the report can be freeform, if streaming clients and server agree to use the same format. For example, the information may be reported as an XML form, such as the one shown in Table 41. Other formats may be used (e.g., comma separated values in a text file, etc.).

TABLE 41

Example of a report of orientation information over areas of a 360 degree video for a streaming session.

```
<?xml version="1.0" encoding="UTF-8"?>
<REPORT>
<!-- Id of content for which statistics are being reported -->
<ContentId value="xyz">
<!-- Grid size -->
<GridSize value="M×N">
<!-- Number of Periods in report -->
<Periods value="K">
<!-- Statistics for Period 1 -->
<Period>
  <!-- One value per grid area. Total of M×N counters. -->
  <Count value="...">
  ...
</Period>
<!-- Statistics for Period K -->
<Period>
  <!-- One value per grid area. Total of M×N counters. -->
  <Count value="...">
  ...
</Period>>
</REPORT>
```

The streaming client may send the report to the server in a manner that fits the application. For example, via an HTTP POST request, by logging the information in the device and periodically uploading it to the server, and/or by passing the report another application in the client device (e.g., reporting app).

Secondary content viewports may be used beyond ad insertion. Secondary content viewports may be defined for areas in a 360 degree video specifically created for E-Commerce or in any 360 degree video where product placement may be. Users may look at these products during video playback. Information such as views of the product, more detailed views of the product, zoomed images, detailed information, clickable links, or the like may be presented to the user based on their interest on some of these products.

E-commerce using secondary content viewports may be provided. FIG. 24 is an example block diagram of e-commerce application with secondary content viewports. A 360 degree video (for example, one with product placement or with objects that may attract the attention of the user) may be annotated using secondary content viewports as described herein. Annotating may include using secondary content viewports in the MPD to identify the areas where the products or objects may be found on the 360 degree video scene during the streaming session. The video may be made available to a streaming server to be used with streaming clients running an e-commerce application that may identify when the user's interest is on the areas of the 360 degree video scene that are identified with secondary content viewports such as ad viewports.

Whether to pause the primary content of the 360 degree video to show secondary content may be determined based on the secondary content viewport parameter(s). For example, the primary content may be paused, and a secondary content associated with the secondary content viewport may be shown during an intermission of playback of the main content. For example, whether a viewer's attention has been on a secondary content viewport for more than a threshold period may be determined. Based on a determination that the secondary content viewport has been viewed for a period of time, the primary content may be paused, and a secondary content associated with the secondary content viewport may be shown. For example, whether a viewer has taken an action to request additional information on the content shown in the secondary content viewport may be determined. Based on a determination that the viewer has requested additional information, the primary content may be paused and a secondary content associated with the secondary content viewport may be shown.

Figure 25:
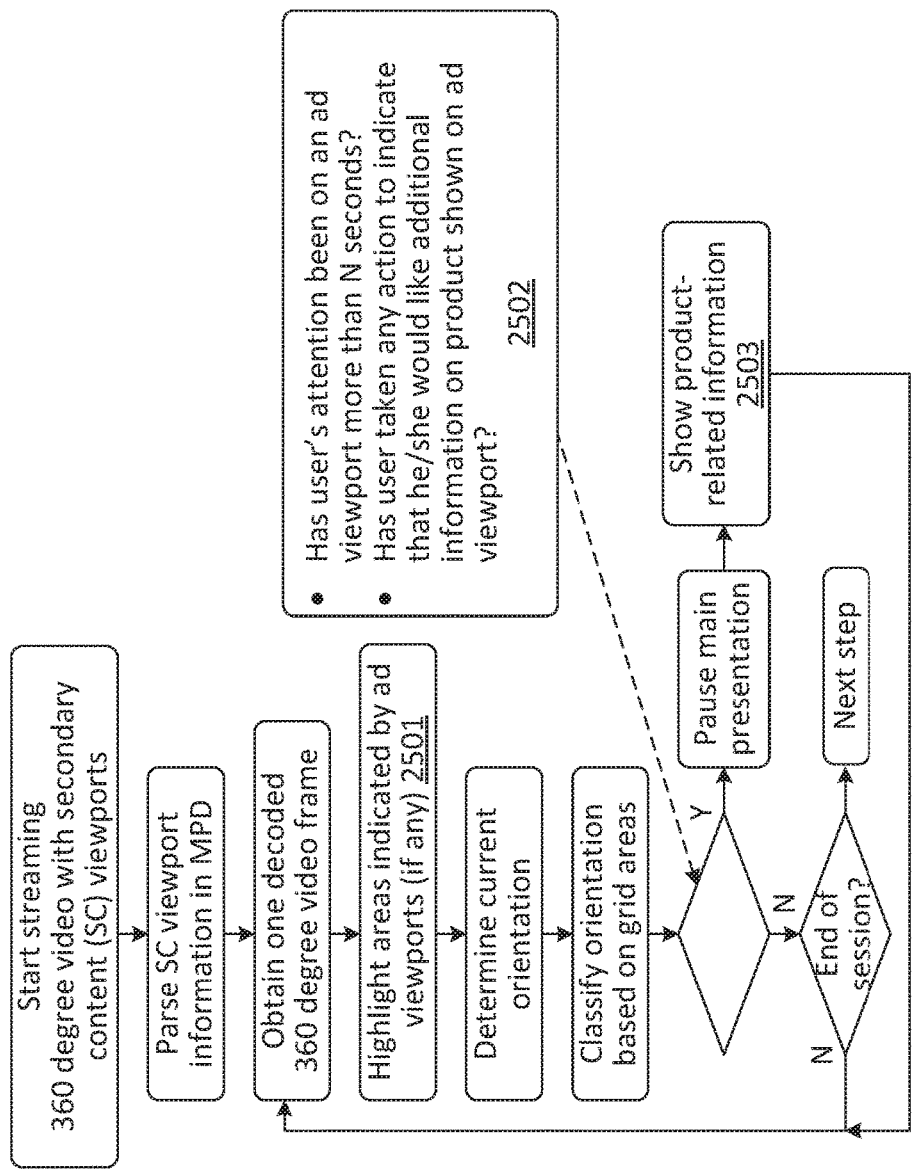
FIG. 25 shows an example e-commerce application using secondary content viewports.
Figure 26:
FIG. 26 shows an example 360 degree video scene with areas highlighted by an e-commerce application.

FIG. 25 shows an example e-commerce application using secondary content viewports. The e-commerce application with secondary content viewports may run on a 360 degree video streaming client. The application may start a streaming session by requesting the MPD of a 360 degree video annotated with secondary content viewports from an HTTP server. The application may parse the MPD to get detailed information about secondary content viewports (e.g., timing and location information of secondary content viewports during the streaming session). When a secondary content viewport is active over a 360 degree video scene, the secondary content viewport area may be highlighted, for example by overlaying a rectangle, thus enabling the user to know that additional information about a product is available if he/she is interested, at 2501. FIG. 26 shows an example 360 degree video scene with areas highlighted by an e-commerce application.

The application may keep statistics about the user's head orientation. The application may determine whether user's attention is on a secondary content viewport based on the head orientation statistics.

As shown in FIG. 25, at 2502, the application may determine whether the user's attention has been on a secondary content viewport over a pre-determined period overtime. The amount of time may be signaled on the MPD as part of the secondary content viewport information, or it may be part of the configuration of the e-commerce application. The application may receive a user indication that may indicate his/her desire to get additional information on the item or product shown on the secondary content viewport by other means. For example, the indication may include one or more of a tap on a touchpad (e.g., Gear VR's touchpad), by a click on a remote control (e.g., Oculus Rift remote control), or by pressing a key on a keyboard or using the mouse (e.g., 360 degree video client on a PC), or the like.

Figure 27:
FIG. 27 shows an example of additional information shown by an c-commerce application.

As shown in FIG. 25, when the application determines that the user desires to view additional information about a product, it may pause the main video streaming presentation, and may present such additional information, at 2503. FIG. 27 shows an example of additional information shown by an e-commerce application, for example when a user indicates interest on an area of the 360 degree video scene identified by ad viewports. Information may be presented, for example, by starting a new video streaming session, by presenting a 360 degree photo with product information, and/or by showing information and/or clickable urls on an overlaid head-up display. The url of the new session may be indicated using remote periods and xiink, as described herein. Such information may be presented until the user indicates that he/she desires to continue the main presentation. Such information may be obtained by the c-commerce application from metadata. Metadata may be obtained from other modules in the system (e.g., from a remote server). Metadata may be embedded in the segment files received from the server (e.g., within the free space ('free' or 'skip') box of the iso-bmff).

Video analytics may be performed for both 360 degree and rectilinear (e.g., 2D) videos. For example, whether viewers are looking at a product or brand identifier in video advertisements may be determined. Where attention is drawn within a web page may be determined. In the rectilinear (2D) video case, even though the entire video frame may always be within the field of view of the user, the eye may be directed toward different elements on the screen, even on small screens such as smartphones.

Figure 28:
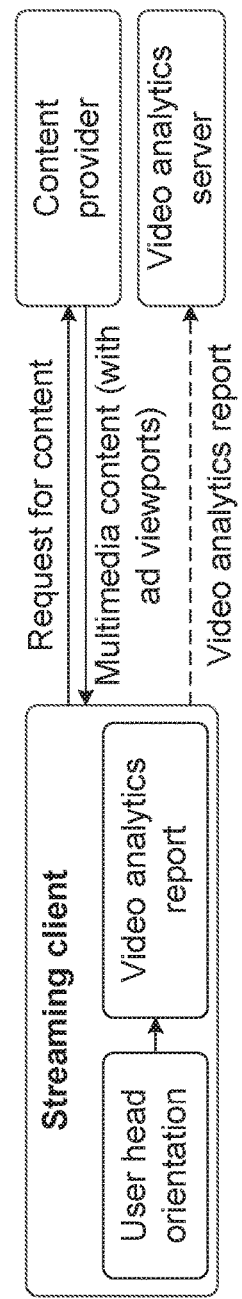
FIG. 28 shows an example video streaming system where secondary content viewports may be used for video analytics.

FIG. 28 shows an example video streaming system where secondary content viewports may be used for video analytics. Secondary content viewports may be used to specify tracking boxes around products in 360 degree video frames and/or in rectilinear (2D) video frames. The streaming client may determine and report whether the viewer looked at the product tracking boxes. The video analytics may be reported to a server where information from multiple streaming clients may be aggregated for further analysis.

Video analytics for 360 degree video may be performed. For 360 degree video streaming using DASH, the techniques described herein may be applied for use with video analytics. For example, a streaming client (e.g., DASH streaming client) may be requested to keep orientation statistics over a period, part of a period or over the entire streaming session using the methods described herein. Secondary content viewports may be defined in the MPD over a period, part of a period, or over the entire streaming session using the methods described herein. The streaming client may be requested to report secondary content viewport statistics back to a reporting server. Secondary content viewport parameter(s) for the secondary content viewport(s) may be tracked as described herein with respect to FIG. 15. For example, user's head orientation information may be reported to a server. As described here, secondary content viewport statistics may be sent to a server or to another application in the client device.

Video analytics for rectilinear (e.g., 2D) video may be performed to generate secondary content viewport parameter(s) such as secondary content viewport statistics. For rectilinear video streaming using DASH, the techniques described herein may be applied for use with video analytics. For example, a streaming client may be requested to keep secondary content viewport statistics such as orientation statistics over a period, part of a period or over the entire streaming session. Secondary content viewports may be defined in the MPD over a period, part of a period, or over the entire streaming session. DASH streaming client may be requested to report secondary content viewport statistics back to a reporting server. Secondary content viewport statistics may be kept as described herein with respect to FIG. 15. Eye-tracking techniques may be used to determine where the user's gaze is on the screen, for example, using web-cams or mobile device cameras. If rectilinear (2D) video is viewed using a HMD, orientation infuriation from the HMD may be used to determine where the user's gaze is on the screen. The secondary content may be selected based on the secondary content viewport statistics that may be generated based on user gaze and/or eye-tracking techniques.

Figure 29A:
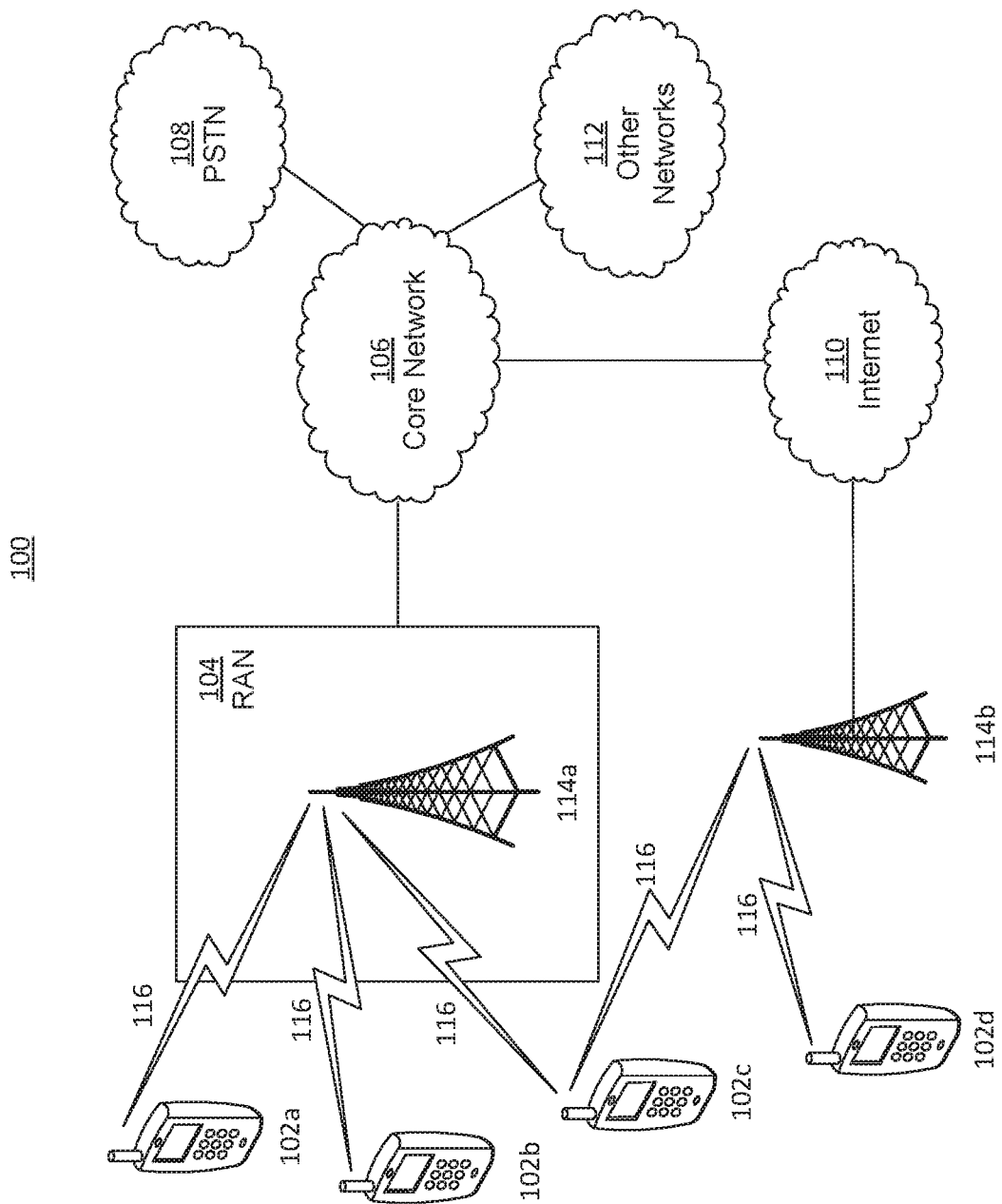
FIG. 29A is a system diagram illustrating an example communications system in which one or more disclosed embodiments may be implemented.

FIG. 29A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 29A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g. remote surgery), an industrial device and applications (e.g. a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include abase station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 1/4b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 14a, 114b may communicate with one or more of the WTRUs 102a, 102b, 102c, 102d over an air interface 116, which may be any suitable wireless communication link (e.g. radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WYRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g. an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Mobile System for Mobile communications (GSM), Enhanced Data rates for GSM Evolution (EDGE), GSM EDGE (GERAN), and the like.

The base station 114b in FIG. 29A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g. for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 80215 to establish a wireless personal area network (WPAN). In yet another embodiment, the base station 114b and the WTRUs 102c, 102d may utilize a cellular-based RA T (e.g. WCDMA, CDMA2000, GSM, LTE, LTE-A, LTE-A Pro, NR etc.) to establish a picocell or femtocell. As shown in FIG. 29A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 29A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include mufti-mode capabilities (e.g. the WTRUs 102a, 102b, 102c, 102d may include multiple transceivers for communicating with different wireless networks over different wireless links). For example, the WTRU 102c shown in FIG. 29A may be configured to communicate with the base station 114a, which may employ a cellular-based radio technology, and with the base station 114b, which may employ an IEEE 802 radio technology.

Figure 29B:
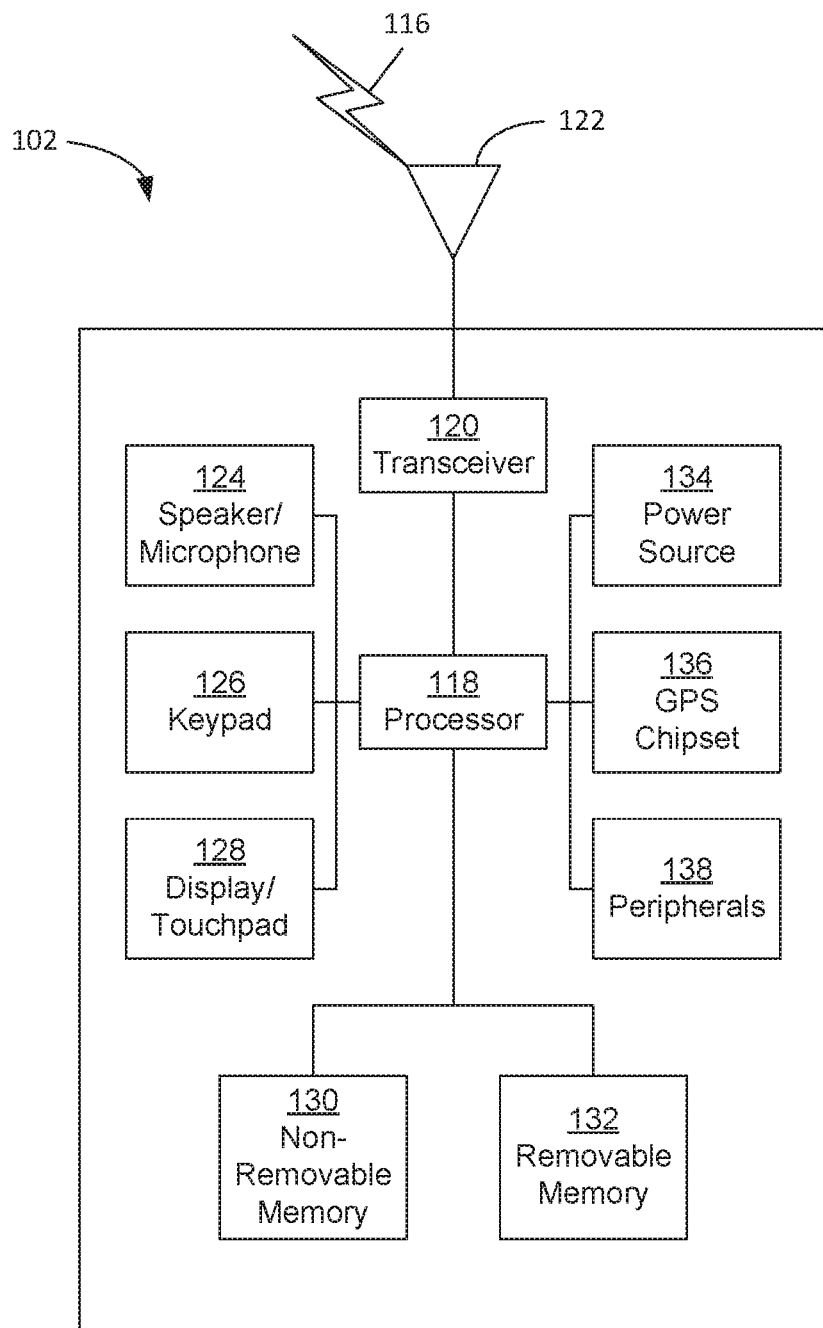
FIG. 29B is a system diagram illustrating an example wireless transmit/receive unit (WTRU) that may be used within the communications system illustrated in FIG. 29A according to an embodiment.

FIG. 29B is a system diagram illustrating an example WTRU 102. As shown in FIG. 29B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 29B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g. the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 29B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g. multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g. a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g. nickelcadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g. longitude and latitude) regarding the current location of the WTRU 102. In addition to, or in lieu of, the information from the GPS chipset 136, the WTRU 102 may receive location information over the air interface 116 from a base station (e.g. base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an c-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g. associated with particular subframes for both the UL (e.g. for transmission) and downlink (e.g. for reception) may be concurrent and/or simultaneous. The full duplex radio may include an interference management unit 139 to reduce and or substantially eliminate self-interference via either hardware (e.g. a choke) or signal processing via a processor (e.g. a separate processor (not shown) or via processor 118). In an embodiment, the WRTU 102 may include a half-duplex radio for which transmission and reception of some or all of the signals (e.g. associated with particular subframes for either the U L (e.g. for transmission) or the downlink (e.g. for reception)).

Figure 29C:
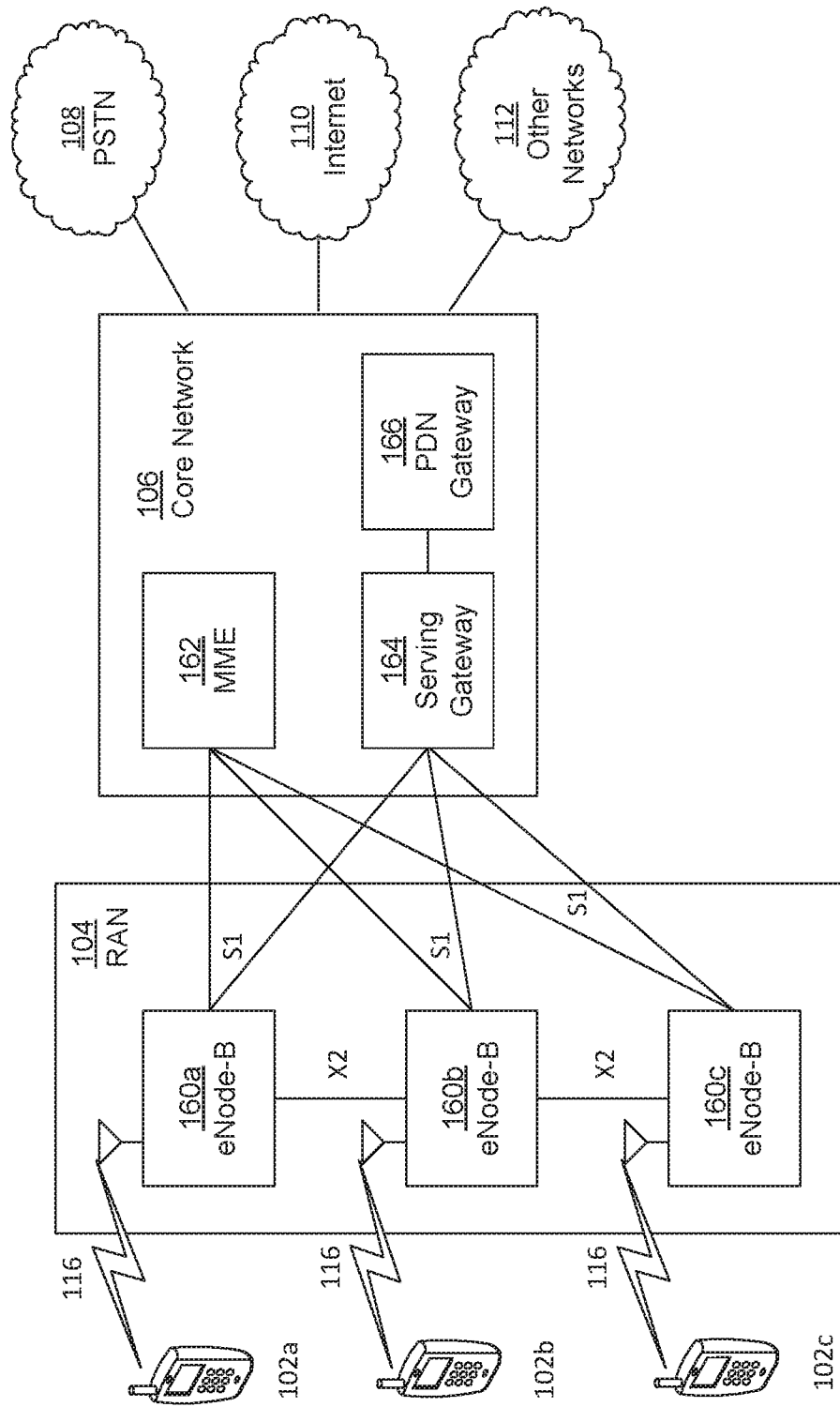
FIG. 29C is a system diagram illustrating an example radio access network (RAN) and an example core network (CN) that may be used within the communications system illustrated in FIG. 29A according to an embodiment.

FIG. 29C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 29C, the eNode-Bs 160a, 160b, 160c may communicate with one another over an X2 interface.

The CN 106 shown in FIG. 29C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g. an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers Although the WTRU is described in FIGS. 29A-29D as a wireless terminal, it is contemplated that in certain representative embodiments that such a terminal may use (e.g. temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the P and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g. directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g. all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g. 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g. every STA), including the AP, may sense the primary channel. If the primary channel is sensed/detected and/or determined to be busy by a particular STA, the particular STA may back off. One STA (e.g. only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.1in, and 802.11ac. 802.11af supports 5 MHz, 10 MHz and 20 MHz bandwidths in the TV White Space (TVWS) spectrum, and 802.11 ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g. only support for) certain and/or limited bandwidths. The MTC devices may include a battery with a battery life above a threshold (e.g. to maintain a very long battery life).

WLAN systems, which may support multiple channels, and channel bandwidths, such as 802.1 in, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g. MTC type devices) that support (e.g. only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AR, the entire available frequency bands may be considered busy even though a majority of the frequency bands remains idle and may be available.

Figure 29D:
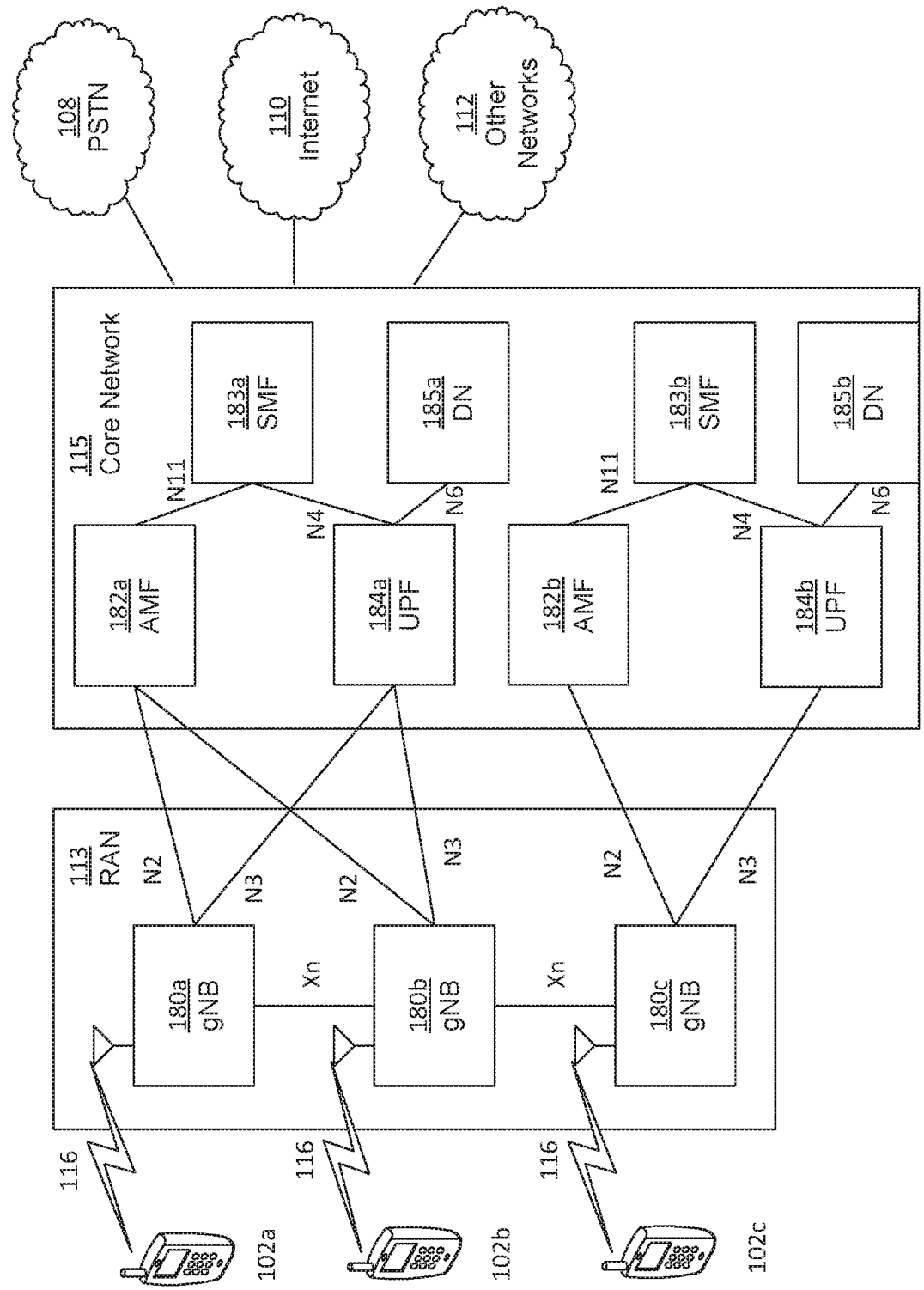
FIG. 29D is a system diagram illustrating a further example RAN and a further example CN that may be used within the communications system illustrated in FIG. 29A according to an embodiment.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code FIG. 29D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the C 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a. 180b, 180e may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g. containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g. such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 29D, the gNBs 180a, 180b, 180c may communicate with one another over an Xn interface.

The CN 115 shown in FIG. 29D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g. handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an Ni1 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g. an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 29A-D, and the corresponding description of FIGS. 29A-D, one or more, or all, of the functions described herein with regard to one or more of WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in attesting scenario in a testing laboratory and/or a non-deployed (e.g. testing) wired and/or wireless communication network in order to implement testing of one or more components. The one or more emulation devices may be test equipment. Direct RF coupling and/or wireless communications via RF circuitry (e.g. which may include one or more antennas) may be used by the emulation devices to transmit and/or receive data.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented within a secondary content decision server, the method comprising:
   sending, to a client device, a plurality of secondary content viewport locations associated with a plurality of secondary content viewports within a 360 degree video;
   sending, to the client device in a media presentation description (MPD), a request for tracking a plurality of secondary content viewport viewing parameters for the plurality of secondary content viewports within the 360 degree video, wherein the plurality of secondary content viewport viewing parameters are tracked according to the request and based on a number of view counts for each of the plurality of secondary content viewing locations associated with each of the plurality of secondary content viewports within the 360 degree video, wherein the number of view counts for each of the plurality of secondary content viewing locations is based on a counter for each of the plurality of secondary content viewport locations, the number of view counts indicates statistical viewing data from a user's viewing orientation for each of the plurality of secondary content viewports within the 360 degree video;
   receiving, from the client device, the number of view counts for each of the plurality of secondary content viewport locations associated with each of the plurality of secondary content viewports within the 360 degree video;
   based on the number of view counts, determining a secondary content to be presented at a secondary content insertion location; and
   sending the secondary content to the client device to present at the secondary content insertion location based on the determined secondary content to be presented at the secondary content insertion location.

2. The method of claim 1, wherein the secondary content insertion location is selected based on the plurality of secondary content viewport viewing parameters.

3. The method of claim 1, wherein the plurality of secondary content viewport locations associated with plurality of secondary content viewports are included in the MPD.

4. The method of claim 1, wherein the secondary content to be presented at the secondary content insertion location is sent to the client device in an updated MPD.

5. The method of claim 1, wherein the plurality of secondary content viewport viewing parameters are tracked further based on a tracking duration that indicates a duration for tracking the plurality of secondary content viewport viewing parameters, a secondary content viewport viewing identifier, and a secondary content viewport classification frequency.

6. A secondary content decision server, comprising:
   a processor configured to:
      send, to a client device, a plurality of secondary content viewport locations associated with a plurality of secondary content viewports within a 360 degree video;
      send, to the client device in a media presentation description (MPD), a request for tracking a plurality of secondary content viewport viewing parameters for the plurality of secondary content viewports within the 360 degree video, wherein the plurality of secondary content viewport viewing parameters are tracked according to the request and based on a number of view counts for each of the plurality of secondary content viewing locations associated with each of the plurality of secondary content viewports within the 360 degree video, wherein the number of view counts for each of the plurality of secondary content viewing locations is based on a counter for each of the plurality of secondary content viewport locations, the number of view counts indicates statistical viewing data from a user's viewing orientation for each of the plurality of secondary content viewports within the 360 degree video;
      receive, from the client device, the number of view counts for each of the plurality of secondary content viewport locations associated with each of the plurality of secondary content viewports within the 360 degree video;
      based on the number of view counts, determine a secondary content to be presented at a secondary content insertion location; and
      send the secondary content to the client device to present at the secondary content insertion location based on the determined secondary content to be presented at the secondary content insertion location.

7. The secondary content decision server of claim 6, wherein the secondary content insertion location is selected based on the plurality of secondary content viewport viewing parameters.

8. The secondary content decision server of claim 6, wherein the plurality of secondary content viewport locations associated with plurality of secondary content viewports are included in the MPD.

9. The secondary content decision server of claim 6, wherein the secondary content to be presented at the secondary content insertion location is sent to the client device in an updated MPD.

10. The secondary content decision server of claim 6, wherein the plurality of secondary content viewport viewing parameters are tracked further based on a tracking duration that indicates a duration for tracking the plurality of secondary content viewport viewing parameters, a secondary content viewport viewing identifier, and a secondary content viewport classification frequency.

* * * * *